US011736892B2

(12) United States Patent
Myshenin et al.

(10) Patent No.: US 11,736,892 B2
(45) Date of Patent: Aug. 22, 2023

(54) COORDINATING TASK ZONES AT A PUBLIC SAFETY INCIDENT SCENE

(71) Applicant: MOTOROLA SOLUTIONS, INC., Chicago, IL (US)

(72) Inventors: Anton Myshenin, Cracow (PL); Pawel Niemiec, Rzeszow (PL); Pawel Tomasik, Cracow (PL); Mariusz Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 163 days.

(21) Appl. No.: 17/435,319

(22) PCT Filed: Mar. 26, 2019

(86) PCT No.: PCT/PL2019/050018
§ 371 (c)(1),
(2) Date: Aug. 31, 2021

(87) PCT Pub. No.: WO2020/197418
PCT Pub. Date: Oct. 1, 2020

(65) Prior Publication Data
US 2022/0141616 A1 May 5, 2022

(51) Int. Cl.
*H04W 4/021* (2018.01)
*H04W 4/90* (2018.01)
*G06Q 10/06* (2023.01)
*G06Q 50/26* (2012.01)
*H04W 4/14* (2009.01)
*H04W 8/08* (2009.01)
*H04W 68/10* (2009.01)
*G06Q 10/0631* (2023.01)

(52) U.S. Cl.
CPC ...... *H04W 4/022* (2013.01); *G06Q 10/06311* (2013.01); *G06Q 50/26* (2013.01);
(Continued)

(58) Field of Classification Search
CPC ......... H04W 4/022; H04W 4/14; H04W 4/90; H04W 8/08; H04W 68/10; G06Q 10/06311; G06Q 50/26; G06Q 50/265
(Continued)

(56) References Cited

U.S. PATENT DOCUMENTS 5,461,390 A 10/1995 Hoshen
5,613,209 A 3/1997 Peterson et al.
(Continued)

OTHER PUBLICATIONS

International Search Report and Written Opinion for Application No. PCT/PL2019/050018 dated Jun. 21, 2019 (9 pages).

*Primary Examiner* — Michael Y Mapa
(74) *Attorney, Agent, or Firm* — Michael Best & Friedrich LLP

(57) ABSTRACT

Methods and systems for coordinating task zones at a public safety incident scene. One system includes an electronic computing device that includes an electronic processor configured to determine a first task to be performed by a first public safety officer and a second task to be performed by a second public safety officer. The electronic processor establishes a first geofence for the first task and a second geofence for the second task. In response to determining that the second geofence at least partially overlaps with the first geofence, the electronic processor determines whether the first task conflicts with the second task. In response to determining that the first task conflicts with the second task, the electronic processor modifies the first task and provides an instruction to a communication device of the first public safety officer to indicate that the first task has been modified.

20 Claims, 9 Drawing Sheets

(52) U.S. Cl.
CPC ............... *H04W 4/14* (2013.01); *H04W 4/90* (2018.02); *H04W 8/08* (2013.01); *H04W 68/10* (2013.01)

(58) Field of Classification Search
USPC .. 455/404.1–404.2, 414.1–414.2, 456.1–457
See application file for complete search history.

(56) References Cited

U.S. PATENT DOCUMENTS

| | | | |
|---|---|---|---|
| 6,239,700 B1 | 5/2001 | Hoffman et al. | |
| 8,098,153 B2 | 1/2012 | Kraus et al. | |
| 8,971,258 B2 | 3/2015 | Marocchi et al. | |
| 9,414,265 B2 | 8/2016 | Miller et al. | |
| 9,787,849 B2 | 10/2017 | Hoover | |
| 10,027,801 B1 * | 7/2018 | Subramanyam | H04W 4/08 |
| 2004/0133457 A1 | 7/2004 | Sadiq et al. | |
| 2008/0242247 A1 | 10/2008 | Shaffer et al. | |
| 2009/0133026 A1 | 5/2009 | Aggarwal et al. | |
| 2009/0138318 A1 | 5/2009 | Hawkins et al. | |
| 2014/0162692 A1 * | 6/2014 | Li | H04L 67/133 455/456.3 |
| 2014/0372015 A1 | 12/2014 | Namm | |
| 2017/0099579 A1 * | 4/2017 | Ryan | H04M 3/5116 |
| 2018/0101923 A1 | 4/2018 | Griesmann et al. | |
| 2018/0150076 A1 | 5/2018 | Shem Tov et al. | |
| 2018/0359654 A1 | 12/2018 | McDonald et al. | |

* cited by examiner

US 11,736,892 B2

COORDINATING TASK ZONES AT A PUBLIC SAFETY INCIDENT SCENE

BACKGROUND OF THE INVENTION

Tablets, laptops, phones (for example, cellular or satellite), mobile (vehicular) or portable (personal) two-way radios, and other communication devices are now in common use by users, for example, first responders (including firemen, police officers, and paramedics, among others). These communication devices provide users with instant access to increasingly valuable additional information and resources, for example, vehicle histories, arrest records, outstanding warrants, health information, real-time traffic or other situational status information, and any other information that may aid the user in making a more informed determination of an action to take or how to resolve a situation, among other possibilities.

Many such communication devices also include, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, a parsed natural language input or an electronic touch interface manipulation associated with an explicit request) in which the electronic digital assistant may reactively provide requested valuable information, or may be based on some other set of one or more context or triggers in which the electronic digital assistant may proactively provide valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers (for example, traffic accidents or environmental hazards), and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1A:
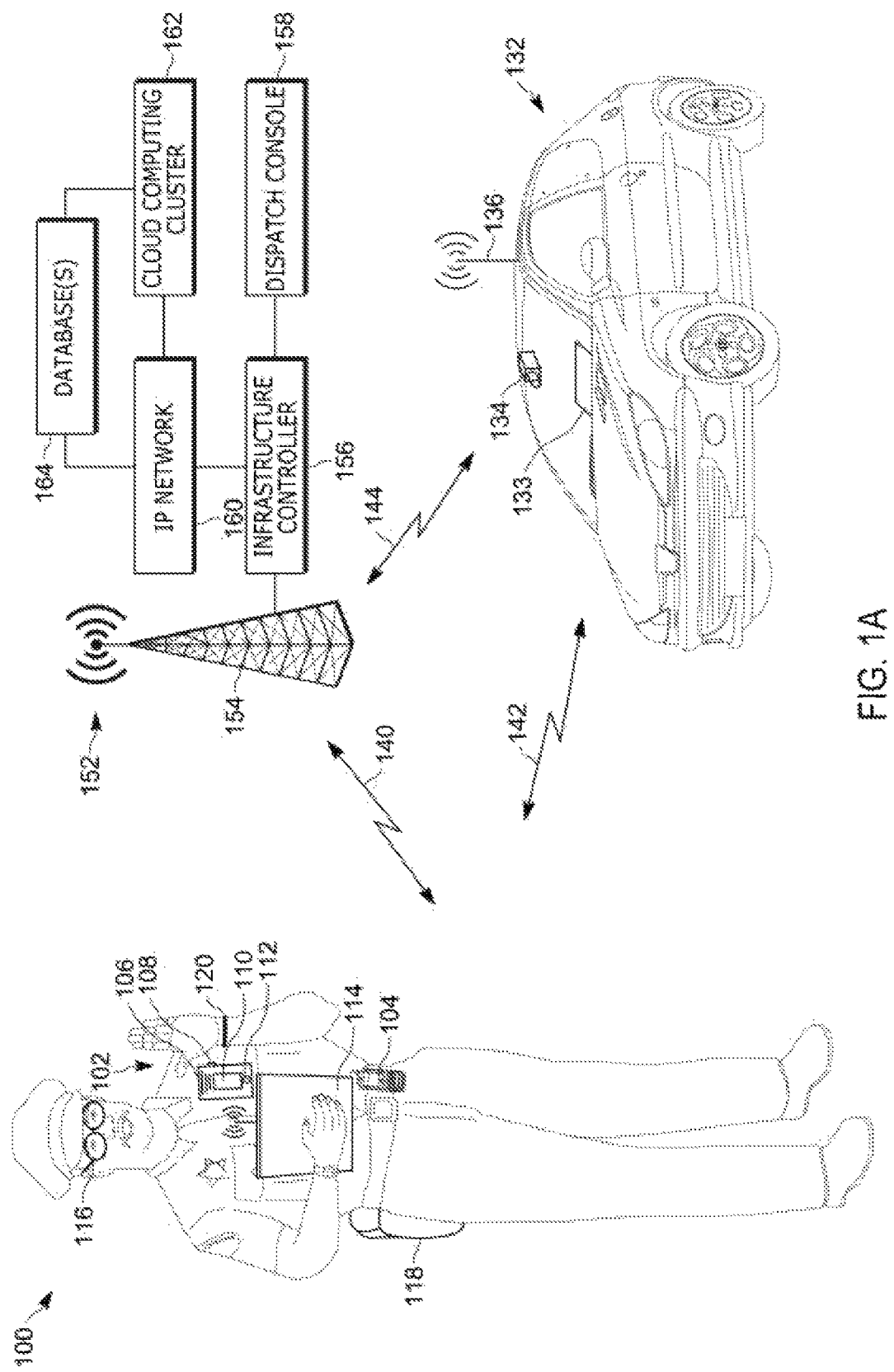
FIGS. 1A and 1B are system diagrams illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety officers may be called to a public safety incident to provide assistance in resolving or preventing a societal or environmental problem (for example, a location where a suspect is committing or has committed a crime, a fire, a vehicular accident, a traffic stop, a location where a natural disaster such as a tornado or earthquake has occurred, and the like). In some embodiments, public safety incidents include incidents involving public service agencies (for example, waste disposal agencies, water management agencies, and the like). In some embodiments, public safety officers include police officers, paramedics, firefighters, dispatchers, and the like. In some embodiments, public safety officers include public service employees employed by public service agencies.

Communication devices may be used by public safety officers handling a public safety incident to receive assignments of tasks to be completed by each public safety officer in order to handle the public safety incident. For example, a first group of firefighters may be assigned a first task to investigate whether there are any victims in a burning building while a second group of firefighters may be assigned a second task to connect a fire hose to the nearest fire hydrant. As another example, one or more paramedics may be assigned a task to provide medical aid to an injured victim. As yet another example, police officers may be assigned a task to gather evidence at a crime scene. For some public safety incidents, different public safety agencies may be involved in handling the public safety incident. For example, when the public safety incident is a vehicular accident, firefighters, police officers, and paramedics may all be dispatched to the location of the vehicular accident to perform various tasks (for example, fire prevention and/or extinguishing, evidence gathering, dispute resolution, providing medical treatment to victims, and the like). During public safety incidents where different tasks are to be performed by public safety officers of different public safety agencies, these different tasks may conflict with each other such that one task hinders the performance of another task. For example, a police officer gathering evidence may accidentally interfere with a firefighter attempting to extinguish a fire. Continuing this example, the firefighter may contaminate or destroy evidence in the course of performing an assigned task. As another example, a police officer may not be wearing proper fire-resistant clothing to be located in an area near a fire. Additionally, public safety officers of different agencies may not understand an overall priority of tasks between different agencies because each public safety officer may only be focused on his/her specific task. For example, a paramedic may not be familiar with police procedures of gathering evidence and may accidentally damage evidence before police officers can collect the evidence. Furthermore, handling a public safety incident may cause public safety officers to experience an increased stress level that may compound the above-noted problems.

Overall, conflicting tasks between public safety officers at a public safety incident may cause communication inefficiencies as additional communication resources (for example, voice call resources) may be used to communicate with officers to prevent or avoid conflicts (for example, dispatchers communicating with officers at the public safety incident). Additionally, conflicting tasks may result in decreased reliability or errors in record management systems, for example, when evidence is gathered that has been damaged or contaminated. Thus, there is a technological problem regarding the discovery and mitigation of conflicting tasks assigned to and/or being performed by public safety officers at a public safety incident scene.

Disclosed are, among other things, a method, device, and system for an electronic digital assistant to coordinate task zones at a public safety incident scene, for example, between public safety officers of different public safety agencies. By coordinating task zones at a public safety incident scene, the disclosed method, device, and system solve the above-noted technological problem by timely recognizing when a conflict or a potential conflict between different tasks of different public safety officers is present and providing an instruction to a communication device of the public safety officer assigned to the lower-priority task to modify the lower-priority task to prevent or mitigate the conflict. The disclosed method, device, and system thus provide public safety officers with valuable information that may not otherwise be provided to them and that allows public safety officers from different agencies to work together more effectively to handle public safety incidents in a more efficient manner. The disclosed method, device, and system also address the technological problem of high usage of communication resources at a public safety incident by lessening an amount of communication resources (for example, voice call resources) used by public safety officers handling the public safety incident. Additionally, the disclosed method, device, and system address the technological problem of decreased reliability in record management systems by, for example, increasing the probability that evidence gathered at the public safety incident is accurate, undamaged, and uncontaminated.

One embodiment provides an electronic computing device that includes an electronic processor. The electronic processor is configured to determine a first task to be performed at a public safety incident scene by a first public safety officer of a first public safety agency, and establish a first geofence around a first location at which the first task is to be performed based on a task type of the first task. The electronic processor is further configured to determine a second task to be performed at the public safety incident scene by a second public safety officer of a second public safety agency, and establish a second geofence around a second location at which the second task is to be performed based on a task type of the second task. The electronic processor is further configured to determine that the second geofence at least partially overlaps with the first geofence. In response to determining that the second geofence at least partially overlaps with the first geofence, the electronic processor is further configured to determine whether the first task conflicts with the second task based on the task type of the first task and the task type of the second task. In response to determining that the first task conflicts with the second task, the electronic processor is further configured to modify the first task based on a priority level of the first task relative to a priority level of the second task. The electronic processor is further configured to provide an instruction to a communication device of the first public safety officer to indicate that the first task has been modified.

Another embodiment provides a method coordinating task zones at a public safety incident scene. The method includes determining, with an electronic processor of an electronic computing device, a first task to be performed by a first public safety officer of a first public safety agency. The method further includes establishing, with the electronic processor, a first geofence around a first location at which the first task is to be performed based on a task type of the first task. The method further includes determining, with the electronic processor, a second task to be performed by a second public safety officer of a second public safety agency. The method further includes establishing, with the electronic processor, a second geofence around a second location at which the second task is to be performed based on a task type of the second task. The method further includes determining, with the electronic processor, that the second geofence at least partially overlaps with the first geofence. In response to determining that the second geofence at least partially overlaps with the first geofence, the method further includes determining, with the electronic processor, that the first task conflicts with the second task based on the task type of the first task and the task type of the second task. In response to determining that the first task conflicts with the second task, the method further includes modifying, with the electronic processor, the first task based on a priority level of the first task relative to a priority level of the second task. The method further includes providing, with the electronic processor, an instruction to a communication device of the first public safety officer to indicate that the first task has been modified.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

Figure 1B:
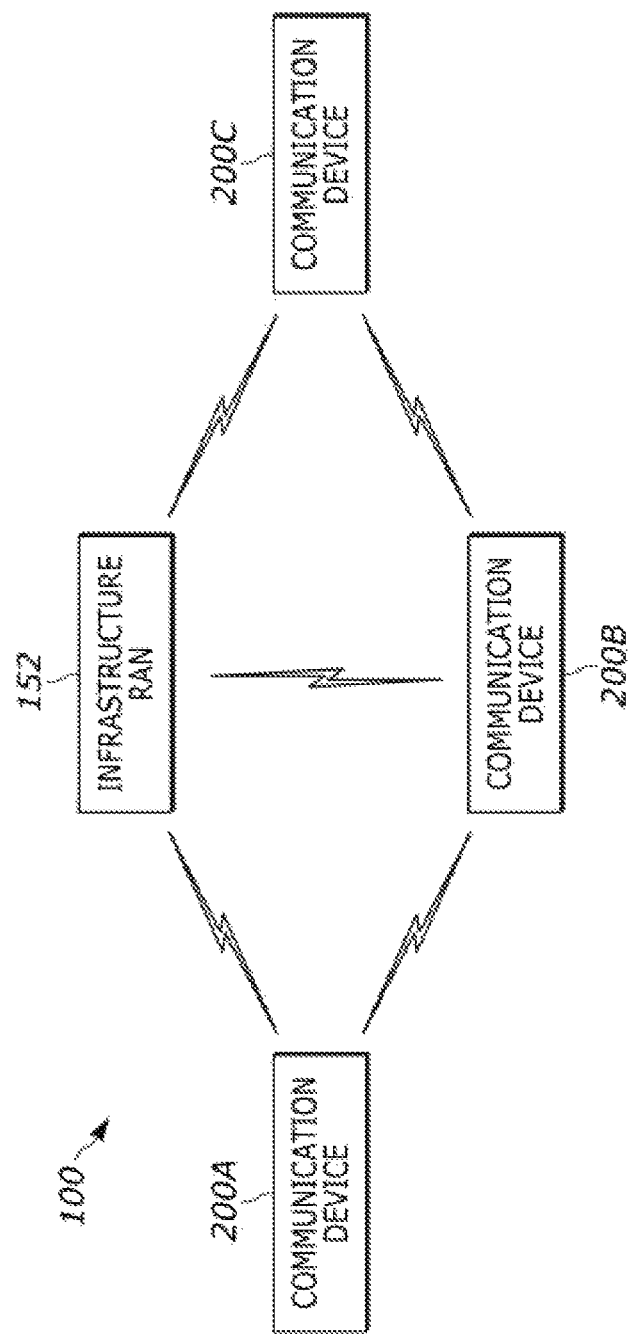

1. Communication System and Device Structures
    a. Communication System Structure Referring now to the drawings, and in particular FIG. 1A, a communication system diagram illustrates a system 100 of devices including a first set of devices that a user 102 (illustrated in FIG. 1A as a public safety officer, for example, a police officer) may wear, for example, a primary battery-powered portable radio 104 used for narrowband and/or broadband direct-mode or infrastructure communications, a battery-powered radio speaker microphone (RSM) video capture device 106, a laptop 114 having an integrated video camera and used for data applications for example incident support applications, smart glasses 116 (for example, which may be virtual reality, augmented reality, or mixed reality glasses), sensor-enabled holster 118, and/or biometric sensor wristband 120. Although FIG. 1A illustrates only a single user 102 with a respective first set of devices, in other embodiments, the single user 102 may include additional sets of same or similar devices, and additional users may be present with respective additional sets of same or similar devices as indicated by FIG. 1B. As an example, additional users may be other public safety officers performing tasks at an incident scene, dispatchers providing information to public safety officers, public safety commanders or incident scene commanders supervising and assigning tasks to other public safety officers, and the like.

System 100 may also include a vehicle 132 associated with the user 102 having an integrated mobile communication device 133, an associated vehicular video camera 134, and a coupled vehicular transceiver 136. Although FIG. 1A illustrates only a single vehicle 132 with a single mobile communication device 133, respective single vehicular video camera 134 and/or microphone, and a single coupled vehicular transceiver 136, in other embodiments, the vehicle 132 may include additional same or similar mobile communication devices, video cameras, microphones, and/or transceivers, and additional vehicles may be present with respective additional sets of mobile communication devices, video cameras, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (for example, voice, audio, video, etc.) communication via a long-range wireless transmitter and/or transceiver that has a transmitter transmit range on the order of miles, for example, 0.5-50 miles, or 3-20 miles (for example, in comparison to a short-range transmitter for example a Bluetooth, Zigbee, or NFC transmitter) with other communication devices and/or the infrastructure RAN 152. The long-range transmitter may implement a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter implements a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In the example of FIG. 1A, the portable radio 104 forms the hub of communication connectivity for the user 102, through which other accessory devices, for example, a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (for example a USB port, an Ethernet port, an audio jack, etc.) for direct electric coupling with the RSM video capture device 106, laptop 114, and/or smart glasses 116. In some embodiments, the portable radio 104 contains a short-range transmitter (for example, in comparison to the long-range transmitter for example a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 contain their own long-range transceivers and communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 is provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user 102, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 is replaced with a more limited body worn camera that includes the video camera 112 and/or microphone noted above for capturing audio and/or video, but may forego one or more of the features noted above that transform the body worn camera into a more full-featured RSM, for example the separate physical PTT switch 108 and the display screen 110, and remote microphone functionality for voice communications in cooperation with portable radio 104.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, for example a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen is, for example, an LCD screen or an OLED display screen. In some embodiments, a touch sensitive input interface is incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information, for example, text, images, or video received from the portable radio 104 or directly from the infrastructure RAN 152. In some embodiments, the smart glasses 116 includes its own long-range transceiver and communicates with other communication devices and/or with the infrastructure RAN 152 or vehicular transceiver 136 directly without passing through portable radio 104. In some embodiments, an additional user interface mechanism, for example, a touch interface or gesture detection mechanism is provided at the smart glasses 116 that allows the user 102 to interact with the display elements displayed on the smart glasses 116 or projected into the user's 102 eyes, or to modify operation of the digital imaging device. In other embodiments, a display and input interface at the portable radio 104 is provided for interacting with smart glasses 116 content and modifying operation of the digital imaging device, among other possibilities.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 also detects whether the first responder's hand is resting on the weapon even if it has not yet been removed from the holster and provide such information to portable radio 104. In some embodiments, a weapon of the user 102 includes a sensor that detects when the weapon is discharged. The detected discharge may be reported to the portable radio 104, for example. Other possibilities exist as well.

The biometric sensor wristband 120 may be an electronic device for tracking an activity of the user 102 or a health status of the user 102, and may include one or more movement sensors (for example, an accelerometer, magnetometer, and/or gyroscope) that may periodically or intermittently provide to the portable radio 104 indications of orientation, direction, steps, acceleration, and/or speed, and indications of health, for example, one or more of a captured heart rate, a captured breathing rate, and a captured body temperature of the user 102, perhaps accompanying other information. In some embodiments, the biometric sensor wristband 120 includes its own long-range transceiver and communicates with other communication devices and/or with the infrastructure RAN 152 or vehicular transceiver 136 directly without passing through portable radio 104.

Although the biometric sensor wristband 120 is shown in FIG. 1A as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor. In some embodiments, the biometric sensor wristband 120 or another device of the user 102 detects characteristics of the environment of the user 102 (for example, temperature, humidity, air quality, and the like).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, Bluetooth Low Energy, WiFi, Near Field Communication (NFC), Radio Frequency ID (RFID) or other short-range wireless protocol having a transmission range on the order of meters, tens of meters, or hundreds of meters.

The portable radio 104 and/or RSM video capture device 106 (or any other device in FIG. 1A, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device is, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices for example the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. In some embodiments, the mobile communication device 133 includes the vehicular transceiver 136 and/or the vehicular video camera 134 integrated therewith, and operates to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above. The omni-directional or uni-directional microphone, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of the mobile communication device 133 perhaps in cooperation with video camera 134 (which may include a visible-light camera, an infrared camera, a time-of-flight depth camera, and/or a light detection and ranging (LiDAR) device). Command information and/or status information, for example, location and speed may be exchanged with the self-driving vehicle via the VAN and/or the PAN (when the PAN is in range of the VAN or via the VAN's infrastructure RAN link). In some embodiments, devices within the vehicle 132 communicate with devices in other vehicles via a Vehicular to Vehicular (V2V) Network.

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above is disposed, and similarly communicates with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN provides infrastructure communications to the other, depending on the situation and the types of devices in the VAN and/or PAN and provides interoperability and communication links between devices (for example video cameras) and sensors within the VAN and PAN.

Although the RSM 106, the laptop 114, and the vehicle 132 are illustrated in FIG. 1A as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras, for example, head-mounted cameras, other types of vehicular cameras, for example, roof-mounted cameras, video cameras located on a drone, or other types of audio and/or video recording devices accessible via a wired or wireless network interface same or similar to that disclosed herein.

In some embodiments, one or more of the user 102, the vehicle 132, the portable radio 104, the RSM video capture device 106, and any other device in FIG. 1A is equipped with an environmental sensor, for example, a chemical, biological, radiological, nuclear, or explosive (CBRNE) sensor. Measurements made by the CBRNE sensor may be stored locally or transmitted via a transmitter or transceiver to other communication devices and/or to the infrastructure RAN 152.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1A, among other possibilities. At least one other terminal, for example used in conjunction with the communication devices, is a fixed terminal, for example a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology for example, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 implements a WLAN technology for example Wi-Fi perhaps operating in accordance with an IEEE 802.11 standard (for example, 802.11a, 802.11b, 802.11g) or for example a WiMAX perhaps operating in accordance with an IEEE 802.16 standard.

Infrastructure RAN 152 may additionally or alternatively operate according to an industry standard LMR wireless access technology for example, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

Group calls may be made between wireless and/or wireline participants in accordance with either a narrowband or a broadband protocol or standard. Group members for group calls may be statically or dynamically defined. That is, in a first example, a user or administrator working on behalf of the user indicates to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, communication devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, communication devices dynamically affiliate with a group (and also disassociate with the group) perhaps based on user input, and the switching and/or radio network tracks group membership and routes new group calls according to the current group membership.

In some instances, broadband and narrowband systems are interfaced via a middleware system that translates between a narrowband PTT standard protocol (for example, P25) and a broadband PTT standard protocol or application (for example, OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1A, such a middleware server is disposed in infrastructure RAN 152 at infrastructure controller 156 or at a separate cloud computing cluster 162 communicably coupled to infrastructure controller 156 via internet protocol (IP) network 160, among other possibilities.

The infrastructure RAN 152 is illustrated in FIG. 1A as providing coverage for the portable radio 104, RSM video capture device 106, laptop 114, smart glasses 116, and/or vehicle transceiver 136 via a single fixed terminal 154 coupled to a single infrastructure controller 156 (for example, a radio controller, call controller, PTT server, zone controller, MME, BSC, MSC, site controller, Push-to-Talk controller, or other network device) and including a dispatch console 158 operated by a dispatcher. In other embodiments, additional fixed terminals, additional controllers, and additional dispatch consoles are disposed to support a larger geographic footprint and/or a larger number of mobile devices.

The infrastructure controller 156 illustrated in FIG. 1A, or some other back-end infrastructure device or combination of back-end infrastructure devices existing on-premises or in the remote cloud computing cluster 162 accessible via the IP network 160 (for example, the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud computing cluster 162 may be comprised of a plurality of computing devices, for example, the one set forth in FIG. 2, one or more of which may be executing none, all, or a portion of an electronic digital assistant service, sequentially or in parallel, across the one or more computing devices. The one or more computing devices comprising the cloud computing cluster 162 may be geographically co-located or may be separated by inches, meters, or miles, and inter-connected via electronic and/or optical interconnects. Although not shown in FIG. 1A, one or more proxy servers or load balancing servers may control which one or more computing devices perform any part or all of the electronic digital assistant service.

As shown in FIG. 1A, database(s) 164 may be accessible via the IP network 160 and/or the cloud computing cluster 162, and may include databases, for example, a long-term video storage database, a historical or forecasted weather database, an offender database perhaps including facial recognition images to match against, a cartographic database of streets and elevations, a traffic database of historical or current traffic conditions, or other types of databases. In some embodiments, the database(s) 164 include databases of different public safety agencies that store information regarding tasks performed by each public safety agency and associated priority levels of the tasks. Databases 164 may further include all or a portion of the databases described herein as being provided at the infrastructure controller 156. In some embodiments, the databases 164 are maintained by third parties (for example, the National Weather Service or a Department of Transportation, respectively). As shown in FIG. 1A, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1A are merely examples. In some embodiments, the system 100 additionally or alternatively includes other databases that store different information. In some embodiments, the databases 164 and/or additional or other databases are integrated with, or internal to, the infrastructure controller 156.

Finally, although FIG. 1A describes a communication system 100 generally as a public safety communication system that includes a user 102 generally described as a police officer and a vehicle 132 generally described as a police cruiser, in other embodiments, the communication system 100 is additionally or alternatively a retail communication system including a user 102 that is an employee of a retailer and a vehicle 132 that is a vehicle for use by the user 102 in furtherance of the employee's retail duties (for example, a shuttle or self-balancing scooter). In other embodiments, the communication system 100 is additionally or alternatively a warehouse communication system including a user 102 that is an employee of a warehouse and a vehicle 132 that is a vehicle for use by the user 102 in furtherance of the employee's retail duties (for example, a forklift). In still further embodiments, the communication system 100 is additionally or alternatively a private security communication system including a user 102 that is an employee of a private security company and a vehicle 132 that is a vehicle for use by the user 102 in furtherance of the private security employee's duties (for example, a private security vehicle or motorcycle). In even further embodiments, the communication system 100 is additionally or alternatively a medical communication system including a user 102 that is a doctor or nurse of a hospital and a vehicle 132 that is a vehicle for use by the user 102 in furtherance of the doctor or nurse's duties (for example, a medical gurney or ambulance). In still another example embodiment, the communication system 100 is additionally or alternatively a heavy machinery communication system including a user 102 that is a miner, driller, or extractor at a mine, oil field, or precious metal or gem field and a vehicle 132 that is a vehicle for use by the user 102 in furtherance of the miner, driller, or extractor's duties (for example, an excavator, bulldozer, crane, front loader). Other possibilities exist as well.

As mentioned previously, many of the devices shown in FIG. 1A (for example, the portable radio 104, the RSM video capture device 106, the laptop 114, the mobile communication device 133, the infrastructure controller 156, the dispatch console 158, and one or more computing devices in the cloud computing cluster 162) may be referred to as communication devices (for example, a communication device 200 as explained below with respect to FIG. 2). Although FIG. 1A shows multiple communication devices 200 associated with the user 102, in some embodiments, the communication system 100 includes communication devices 200 of multiple users. For example, as shown in FIG. 1B, the communication device 200A is associated with a first user, the communication device 200B is associated with a second user, and the communication device 200C is associated with a third user. As indicated by FIG. 1B, in some embodiments, the communication devices 200A, 200B, and 200C communicate with each other over the infrastructure RAN 152 and/or communicate with each other directly as described previously herein. Similarly, other devices, for example the dispatch console 158, may communicate with communication devices 200 of multiple users through the infrastructure RAN 152. In some embodiments, one or more users have multiple associated communication devices 200, for example, as shown in FIG. 1A.

b. Device Structure

Figure 2:
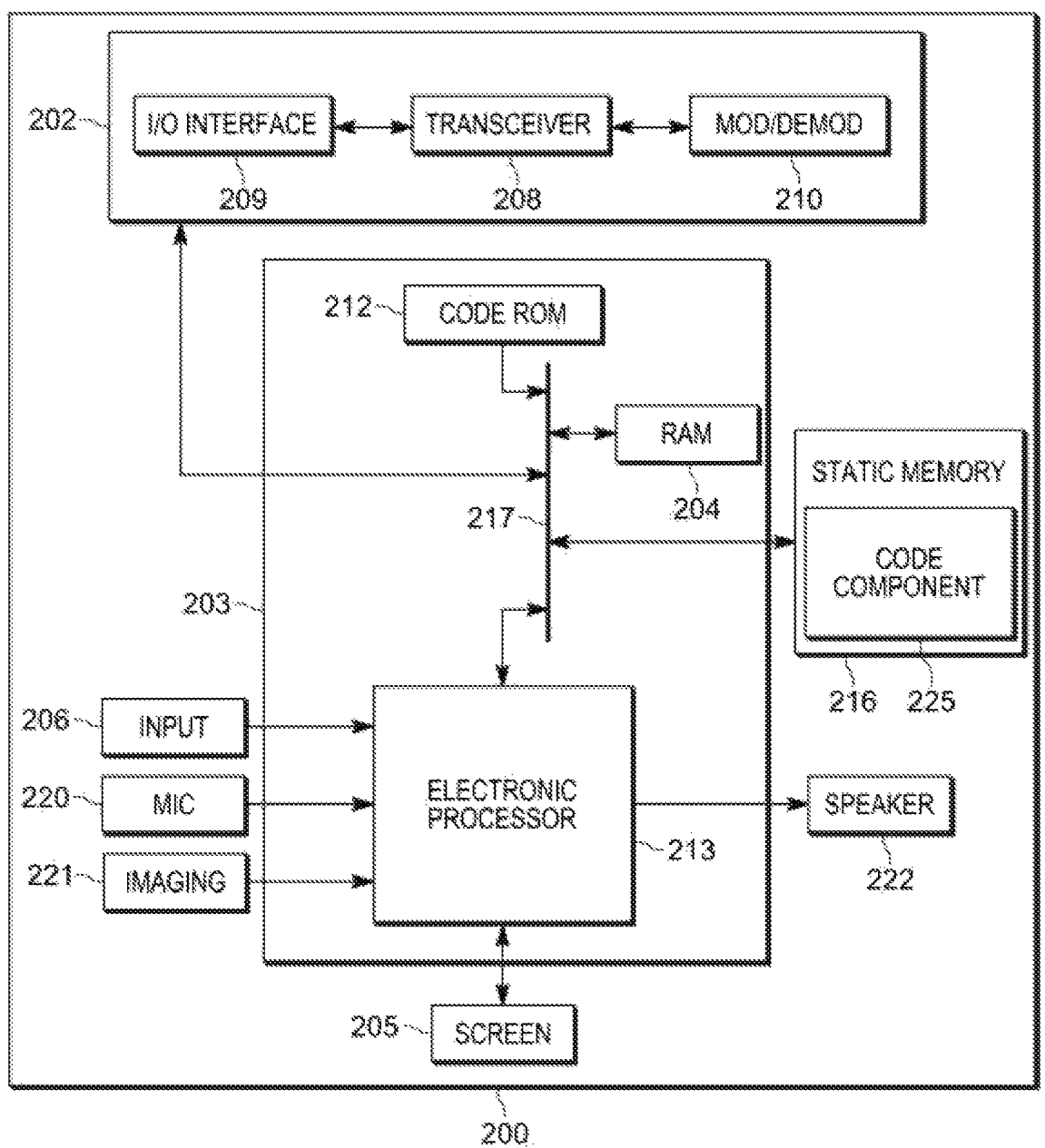
FIG. 2 is a device diagram showing a device structure of a communication device of the system of FIGS. 1A and 1B in accordance with some embodiments.

FIG. 2 sets forth a schematic diagram that illustrates a communication device 200 according to some embodiments of the present disclosure. The communication device 200 is, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1A, and/or is a distributed communication device across two or more of the foregoing (or multiple of a same type of one of the foregoing) and linked via a wired and/or wireless communication link(s). In some embodiments, the communication device 200 (for example, the portable radio 104) is communicatively coupled to other devices, for example, the sensor-enabled holster 118 as described above. In such embodiments, the combination of the portable radio 104 and the sensor-enabled holster 118 may be considered a single communication device 200.

While FIG. 2 represents the communication devices described above with respect to FIGS. 1A and 1B, depending on the type of the communication device, the communication device 200 may include fewer or additional components in configurations different from that illustrated in FIG. 2. For example, in some embodiments, the communication device 200 embodied as the infrastructure controller 156 does not include one or more of the screen 205, microphone 220, imaging device 221, and speaker 222. As another example, in some embodiments, the communication device 200 embodied as the portable radio 104 or the RSM video capture device 106 further includes a location determination device (for example, a global positioning system (GPS) receiver) as explained above. As another example, the communication device 200 embodied as the portable radio 104 or the RSM video capture device 106 may include a motor configured to vibrate to provide haptic notifications to the user 102. Other combinations are possible as well.

As shown in FIG. 2, the communication device 200 includes a communications unit 202 coupled to a common data and address bus 217 of a processing unit 203 that includes an electronic processor 213. The communication device 200 may also include one or more input devices (for example, keypad, pointing device, touch-sensitive surface, button, a microphone 220, an imaging device 221, and/or another input device 206) and an electronic display screen 205 (which, in some embodiments, is a touch screen and thus also acts as an input device), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices 200, for example a the portable radio 104, the laptop 114, the wireless RAN 152, and/or the mobile communication device 133.

For example, the communications unit 202 may include one or more wireless transceivers 208, for example a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, for example an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the microphone 220, the imaging device 221, the other input device 206, and/or the speaker 222. Static memory 216 may store operating code 225 for the electronic processor 213 that, when executed, performs one or more of the steps set forth in FIG. 3 and the accompanying text.

The static memory 216 may comprise, for example, a hard-disk drive (HDD), an optical disk drive for example a compact disk (CD) drive or digital versatile disk (DVD) drive, a solid state drive (SSD), a tape drive, a flash memory drive, or a tape drive, and the like.

2. Processes for Coordinating Task Zones at a Public Safety Incident Scene

In some embodiments, an individual component and/or a combination of individual components of the system 100 may be referred to as an electronic computing device that implements an electronic digital assistant as mentioned above. For example, the electronic computing device is a single electronic processor (for example, the electronic processor 213 of the portable radio 104 or the dispatch console 158). In other embodiments, the electronic computing device includes multiple electronic processors distributed remotely from each other. For example, the electronic computing device is implemented on a combination of at least two of the electronic processor 213 of the portable radio 104, the electronic processor 213 of the dispatch console 158, the electronic processor 213 of the infrastructure controller 156, and the electronic processor 213 of a back-end device in the cloud computing cluster 162 accessible via the IP network 160.

To use the electronic digital assistant implemented by the electronic computing device, the user 102, for example, provides an oral query that is received by the microphone 220 of the communication device 200. The electronic computing device receives signals representative of the oral query (in other words, audio data) from the microphone 220 and analyzes the signals to determine the content of the oral query. For example, the electronic computing device includes a natural language processing (NLP) engine configured to determine the intent and/or content of the oral query. The electronic computing device may also be configured to determine a response to the oral query (for example, by retrieving stored data or by requesting data from the database(s) 164) and provide the response to an output device of the communication device 200 (for example, one or more of the speaker 222 via a generated audio response and the screen 205 via a generated text-based response). In other words, one or more of the communication devices 200, embodied in one or more of the communication devices of FIG. 1A, for example the portable radio 104, the dispatch console 158, the infrastructure controller 156, and/or cloud computing cluster 162 may include a natural language processing engine to analyze oral queries received by the microphone 220 of the communication device 200 and provide responses to the oral queries.

Although an oral query is described above, in some embodiments, the electronic computing device receives and responds to other types of queries and inputs. For example, the user 102 submits a text query to the electronic computing device by typing the text query into a hard keyboard input device or a soft keyboard input provided on the screen 205 of the communication device 200. As another example, the user 102 uses the imaging device 221 to capture an image or video of an area and press a hard or soft key to send the image or video to the electronic computing device to, for example, allow the electronic computing device to identify an object in the image or video. As another example, the electronic computing device activates the electronic digital assistant in response to receiving a signal from a sensor of at least one of the biometric sensor wristband 120, the sensor-enabled holster 118, and the like. For example, the electronic computing device activates the electronic digital assistant in response to a heart rate of the user 102 increasing above a predetermined threshold or in response to the user 102 drawing a weapon from the sensor-enabled holster 118. As yet another example, the electronic computing device activates the electronic digital assistant in response to receiving information from another communication device 200 (for example, receiving information that a new task has been assigned to the user 102). As another example, the electronic computing device activates the electronic digital assistant whenever communication devices 200 of public safety officers are in use to allow the electronic digital assistant to monitor public safety incidents to provide assistance to public safety officers handling the public safety incidents as described below.

When monitoring a public safety incident, the electronic digital assistant of the electronic computing device may retrieve information related to the public safety incident in a number of ways. For example, the electronic computing device monitors communications between communication devices 200 of public safety officers to determine tasks that have been assigned to the public safety officers. For example, the electronic computing device uses the natural language processing engine to monitor assignments of tasks provided by a supervisor to public safety officers over a talk group communication channel or over individual communication channels. The electronic computing device may also retrieve sounds captured by the microphone 220 that are not being communicated over the RAN 152 by the communication device 200. For example, the electronic computing device may retrieve voice data of a public safety officer handling the public safety incident who is yelling instructions to another public safety officer located nearby. The electronic computing device may use the natural language processing engine to analyze this voice data to determine information related to the public safety incident, for example, new issues that are being experienced by the public safety officers, new tasks to be performed by the public safety officers, and the like. As another example of the electronic computing device retrieving information related to the public safety incident, the electronic computing device may communicate with one or more communication devices 200 (for example, the portable radio 104 and/or RSM video capture device 106 of one or more public safety officers, a roof-mounted camera, a drone that includes a camera, and/or the like). For example, the electronic computing device receives image/video data of the public safety incident from these communication devices 200 and uses image/video analysis techniques to identify different situations (for example, victims trapped in a vehicle, a hazardous chemical leak, a fire, tasks currently being performed by the public safety officers at the incident scene, and the like). Additionally, the electronic computing device may communicate with a communication device 200 of a supervisor and/or incident scene commander to receive information regarding tasks that are assigned to various public safety officers. For example, the supervisor and/or incident scene commander may enter the tasks assigned to each officer via a user input of the communication device 200 to be provided to the electronic computing device. In summary, the electronic digital assistant implemented by the electronic computing device may be able to communicate with many different communication devices 200 to retrieve information related to the public safety incident. This information related to the public safety incident may then be used by the electronic computing device when performing the methods described below.

As explained above, due to public safety officers from different public safety agencies performing different tasks at the same public safety incident, these different tasks may conflict with each other. Conflicting tasks may cause communication inefficiencies as additional communication resources (for example, voice call resources) may be used to communicate with officers to prevent or avoid conflicts (for example, dispatchers communicating with officers at the public safety incident). Additionally, conflicting tasks may result in decreased reliability or errors in record management systems, for example, when evidence is gathered that has been damaged or contaminated. Thus, there is a technological problem regarding the discovery and mitigation of conflicting tasks assigned to and/or being performed by public safety officers at a public safety incident scene.

Figure 3:
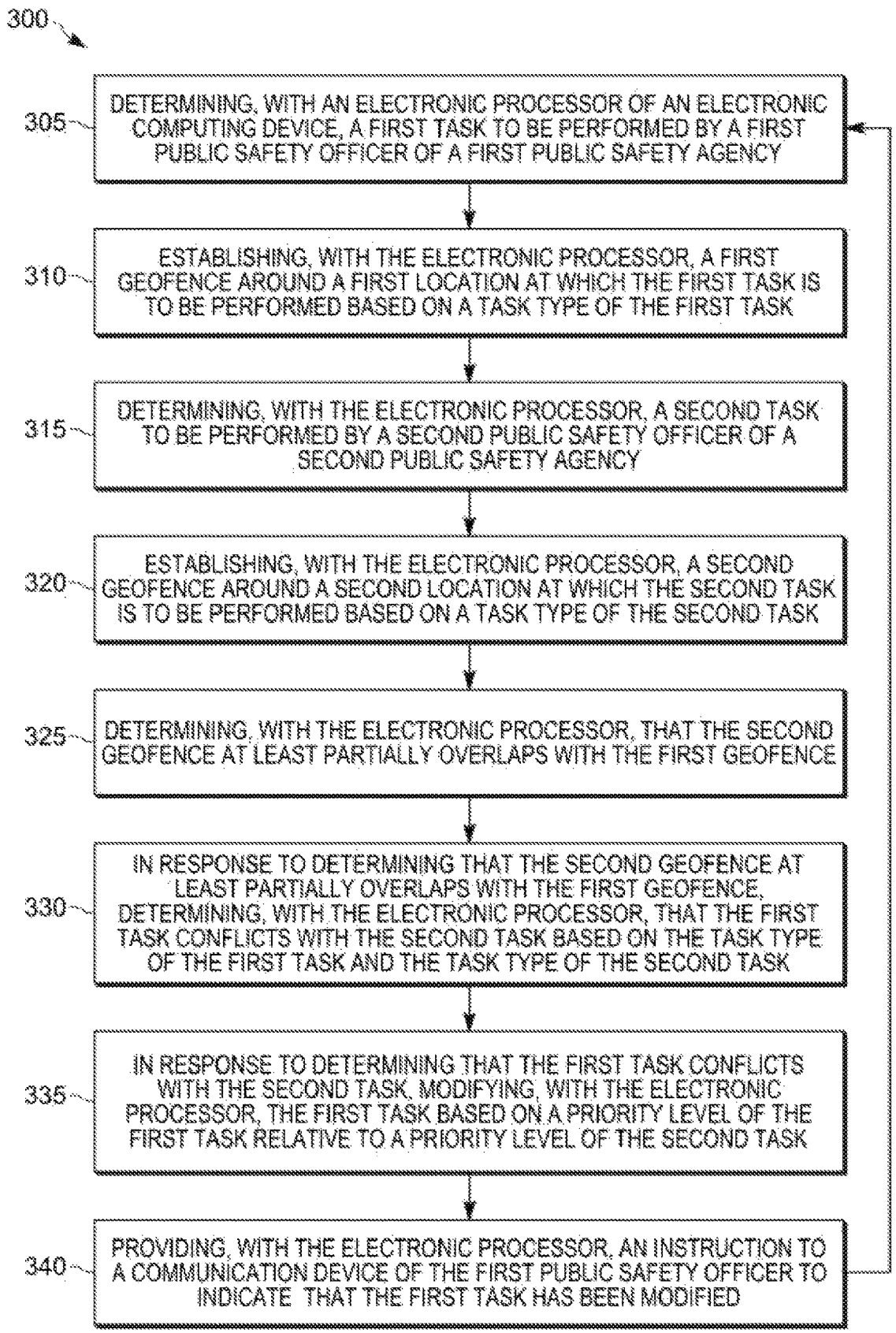
FIG. 3 illustrates a flow chart of a method performed by an electronic digital assistant for coordinating task zones at public safety incident scene in accordance with some embodiments.

To address this technological problem, the electronic computing device performs, for example, a method 300 of FIG. 3 to coordinate task zones at a public safety incident scene, for example, between public safety officers of different public safety agencies. Performance of the method 300 allows the electronic computing device to timely recognize when a conflict or a potential conflict between different tasks of different public safety officers is present and provide an instruction to a communication device 200 of the public safety officer assigned to the lower-priority task to modify the lower-priority task to prevent or mitigate the conflict.

FIG. 3 illustrates a flowchart of the method 300 performed by the electronic computing device for coordinating task zones at a public safety incident scene. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic computing device determines a first task to be performed by a first public safety officer of a first public safety agency. In some embodiments, a task includes a piece of work to be accomplished by a public safety officer (for example, extinguishing a fire, collecting evidence, interrogating a witness, providing medical aid, and the like). In some embodiments, a task may include one or more actions (in other words, sub-tasks) to be performed by a person when performing the task that further define the task as explained in greater detail below. In some embodiments, a task may include one or more actions to be avoided by the person when performing the task that further define the task (as explained in greater detail below). In some embodiments, the task includes one or more resources that are recommended or required to perform the task that further define the task (for example, fire protective clothing, gloves to avoid contamination, a fire hose and/or extinguisher, other equipment and/or clothing recommended to perform the task, and the like). In some embodiments, the task includes one or more objects of interest that further define the task (for example, a specific type of evidence that is to be collected, a specific type of medical aid to be provided, and the like). In some embodiments, the tasks includes an area in which the task is to be performed that further defines the task (for example, a geofence as explained in greater detail below with respect to block 310).

In some embodiments, the electronic computing device determines the first task by monitoring communications of a communication device 200 of the first public safety officer (for example, communications between the first public safety officer and a supervisor or incident scene commander who assigns the first task). In some embodiments, a communication device 200 of the supervisor or incident scene commander receives a user input from the supervisor or incident scene commander that indicates the first task that is assigned to the first public safety officer (for example, an assignment of the first task on a task list to the first public safety officer via a received touch screen input). The electronic computing device may communicate with the communication device 200 of the supervisor or incident scene commander to determine the first task that is assigned to the first public safety officer. In some embodiments, the electronic computing device determines the first task based on other retrieved information related to a public safety incident. For example, the electronic computing device may determine the first task by retrieving audio and/or image/video data from communication devices 200 at the incident scene and analyzing the data to determine the first task being performed by the first public safety officer or the first task that was assigned to the first public safety officer.

In some embodiments, the electronic computing device determines the first task to be performed by the first public safety officer in response to the first public safety officer arriving at the incident scene of the public safety incident. For example, the electronic computing device monitors a location of the communication device 200 of the first public safety officer and begins analyzing information related to the public safety incident to determine the first task in response to the location indicating that the first public safety officer has arrived at the incident scene. In other embodiments, the electronic computing device may attempt to determine the first task prior to first public safety officer arriving at the incident scene. For example, the electronic computing device determines the first task in response to the first public safety officer being instructed to respond to the public safety incident by a dispatcher. Continuing this example, the dispatcher may assign the first task to the first public safety officer (for example, provide aid to an injured victim) along with the instruction to respond to the public safety incident. In this example, the electronic computing device determines the first task is to provide aid to the injured victim based on the electronic computing device monitoring communications between the communication devices 200 of the dispatcher and the first public safety officer.

At block 310, the electronic computing device establishes a first geofence (in other words, a task zone) around a first location at which the first task is to be performed based on a task type of the first task. In some embodiments, the electronic computing device accesses a database 164 of the first public safety agency to establish the first geofence. For example, the database 164 of the first public safety agency may store an estimated amount of space for performance of the first task. For example, when the task type is providing aid to a victim, the estimated amount of space for performance of the task may be a three meter radius. As another example, when the task type is extinguishing a fire, the estimated amount of space for performance of the task may be a thirty meter radius. As yet another example, when the task type is extinguishing a fire near a hazardous/explosive chemical (for example, a propane tank), the estimated amount of space for performance of the task may be a one hundred meter radius. The above distances are merely examples. Additionally, while the term "radius" is used to describe the estimated amount of space for performance of the task, in some embodiments, geofences (in other words, task zones) are defined in non-circular manners (for example, other polygonal shapes or irregular shapes).

In some embodiments, a monitored location of the communication device 200 of the first public safety officer is used as a center point of the geofence. In other words, the electronic computing device may establish the first geofence around the location of the communication device 200 of the first public safety officer. In such embodiments, the electronic computing device updates/moves the first geofence as the first public safety officer moves at the public safety incident. In other embodiments, the electronic computing device establishes a stationary location as the center point of the first geofence. For example, the stationary location may be selected by a first responder or an incident scene commander via a user input on a communication device 200 in accordance with the description immediately below.

In some embodiments, the electronic computing device establishes the first geofence based on user input received via a communication device 200 of a first responder who first arrives at the public safety incident or an incident scene commander at the public safety incident. For example, the first responder or incident scene commander may survey the public safety incident and enter initial task zones on a map displayed on the communication device 200 (for example, see FIG. 4B). The electronic computing device receives information indicative of these task zones from the communication device 200 and establish the first geofence based on the received information, for example, in combination with monitored communications and other received information related to the public safety incident as described above.

At block 315, the electronic computing device determines a second task to be performed by a second public safety officer of a second public safety agency. In some embodiments, the electronic computing device determines the second task to be performed by the second public safety officer in a similar manner as described above with respect to block 305 for determining the first task to be performed by the first public safety officer.

At block 320, the electronic computing device establishes a second geofence around a second location at which the second task is to be performed based on a task type of the second task. In some embodiments, the electronic computing device establishes the second geofence associated with the second task in a similar manner as described above with respect to block 310 for establishing the first geofence associated with the first task.

At block 325, the electronic computing device determines that the second geofence at least partially overlaps with the first geofence. In some embodiments, the electronic computing device compares a location of the center point and radius of the first geofence (in other words, a first task zone) to the center point and radius of the second geofence (in other words, a second task zone). In some embodiments, at least partial overlap of the first geofence and the second geofence indicates that the estimated amount of space for performance of the first task overlaps with the estimated amount of space for performance of the second task such that the first task and the second task might conflict with each other. Accordingly, when the first geofence and the second geofence at least partially overlap with each other as determined at block 325, the method 300 proceeds to block 330. However, when the electronic computing device determines that the first geofence and the second geofence do not overlap with each other, the electronic computing device does not carry out block 330 of method 300, but instead continues monitoring information related to the public safety incident to determine movement of previously-established geofences and to establish new geofences for new tasks that are to be performed. In other words, execution of the method 300 returns to block 305 to repeat blocks 305 through 320 until the electronic computing device determines that two geofences at least partially overlap with each other.

At block 330, in response to determining that the second geofence at least partially overlaps with the first geofence, the electronic computing device determines whether the first task conflicts with the second task based on the task type of the first task and the task type of the second task. In some embodiments, the electronic computing device is configured to determine whether the first task conflicts with the second task by accessing one or more databases 164 including information regarding performance of at least one of the first task and the second task. In some embodiments, the information regarding the performance of at least one of the first task and the second task includes actions to be taken by a person when performing at least one of the first task and the second task, actions to be avoided by the person when performing at least one of the first task and the second task, and an estimated amount of space for performance of at least one of the first task and the second task. For example, the information retrieved by the electronic computing device about a task may indicate that a task of extinguishing a fire includes wearing fire-protective clothing and use of a fire extinguisher and/or fire hose. The information may also indicate that a task of collecting evidence includes wearing of gloves and avoiding introduction of additional chemicals/substances into the area where the evidence is located (for example, to avoid contamination/destruction of the evidence). The information may also indicate that a task of providing aid to an injured victim includes wearing of protective clothing (for example, gloves, protective eyewear, a mask, and/or the like) and avoiding introduction of any non-medical personnel into the area where the victim is located (for example, to prevent further injury to the victim, to prevent a public safety officer with medical training who is providing aid to the victim from being distracted, and/or the like). In other words, each public safety agency may maintain information in a database(s) 164 that includes a list or mapping of actions able to be performed and types of public safety officers that are permitted to be within a geofence when a task is being performed within the geofence (because no potential conflict exists). The information in the database(s) 164 may also include a list or mapping of actions not able to be performed and types of public safety officers that are not permitted to be within the geofence when the task is being performed within the geofence (because potential conflicts exist). In some embodiments, the database(s) 164 that stores the actions related to each public safety task is user-configurable such that the actions to be performed and the actions that are not permitted may be set as desired by users (for example, public safety representatives from public safety agencies).

With reference to the above examples of information retrieved from the database(s) 164 based on different task types of the tasks, the electronic computing device may determine that a first task of extinguishing a fire conflicts with a second task of collecting evidence because the two tasks include wearing of different clothing. For example, it may be advisable for public safety personnel within a geofence where a fire extinguishing task is being executed to be wearing fire-protective clothing. Continuing this example, the first task of extinguishing a fire may conflict with the second task of collecting evidence because the water or other chemicals used to extinguish the fire may contaminate/destroy evidence to be gathered. As another example based on the above examples of information retrieved from the database(s) 164 based on different types of tasks, the electronic computing device may determine that a first task of collecting evidence conflicts with a second task of providing aid to an injured victim because collecting evidence near an injured victim may cause further injury to the victim and/or may distract medical personnel that are providing aid to the victim. As yet another example, the electronic computing device may determine that a first task of questioning a witness does not conflict with a second task of securing a perimeter of a crime scene because one police officer questioning the witness within the crime scene may not likely affect the ability of other police officers to secure the perimeter of the crime scene.

When the electronic computing device determines that a conflict between the first task and the second task does not exist based on the information retrieved from the database(s) 164, the method 300 may not proceed to block 335 and may instead continue monitoring information related to the public safety incident to determine movement of previously-established geofences, to establish new geofences for new tasks that are to be performed, and to continue evaluating whether other tasks conflict with each other the public safety incident. In other words, the electronic computing device executes method 300 to return to block 305 and repeat blocks 305 through 330 until the electronic computing device determines that two tasks with geofences that at least partially overlap with each other conflict with each other. When the electronic computing device determines that the first task conflicts with the second task based on information retrieved from the database(s) 164 based on the task type of the first task and the task type of the second task, the method 300 proceeds to block 335.

At block 335, in response to determining that the first task conflicts with the second task, the electronic computing device modifies the first task based on a priority level of the first task relative to a priority level of the second task. In some embodiments, the electronic computing device is configured to determine the priority level of the first task relative to the priority level of the second task by accessing a database 164 that includes a plurality of public safety tasks and a priority level associated with each public safety task (for example, via a stored mapping). For example, the database 164 may include a ranked list of many possible public safety tasks (for example, hundreds of possible public safety tasks) such that rankings of two specific tasks may be compared to each other by the electronic computing device to determine which of the first task and the second task has a higher associated priority. As another example, priority levels may include a high priority level, a medium priority level, and a low priority level. As yet another example, priority levels may include an integer ranking from one to ten with ten be the highest priority task and one being the lowest priority task. The database 164 may store a priority level for each possible public safety task to allow the electronic computing device to determine which of two public safety tasks has a higher priority.

For example, tasks that involve preventing injury to the general public, for example, extinguishing a fire in a building, diffusing a bomb, handling a toxic chemical leak, and the like, may have a higher priority than other tasks. For example, these tasks may have a high priority level or a priority ranking between eight and ten. As another example, tasks that involve providing medical aid to injured victims and protecting injured victims at an incident scene may have a high priority level or a priority ranking between seven and nine. As yet another example, administrative tasks to aid in providing information about the public safety incident, for example, evidence collection, interviewing witnesses, and the like, may have a lower priority than the above-noted tasks. For example, such administrative tasks may have a medium priority level or a priority ranking between four and six. As another example, other tasks, for example, cleaning up the incident scene, responding to inquiries from reporters, and the like, may have a lower priority than the above-noted tasks. For example, such tasks may have a low priority level or a priority ranking between one and three.

The above-noted tasks, priority levels, and rankings are merely examples. In some embodiments, the database 164 that stores the public safety tasks and associated priority levels is user-configurable such that the priority levels of each task may be set as desired by users (for example, a group of public safety representatives from different public safety agencies).

In some embodiments, the electronic computing device determines that the first task has a lower priority level than the second task. In response to this determination, the electronic computing device modifies the first task. In some embodiments, the electronic computing device modifies the first task by at least one of (i) adjusting the first geofence to avoid overlap with the second geofence, (ii) changing the first task to a third task that does not conflict with the second task, and (iii) determining one or more actions that are to be avoided by the first public safety officer while performing the first task within the second geofence.

As an example of adjusting the first geofence to avoid overlap with the second geofence, the electronic computing device adjusts the first geofence to eliminate or reduce the overlap between the first geofence and the second geofence. In this example, the elimination or reduction in overlap of the first geofence and the second geofence may prevent the first public safety officer from entering an area (in other words, the second geofence or a portion of the second geofence) where the first public safety officer may interfere with the higher-priority task being performed by the second public safety officer. In other words, the modification of the first task may instruct the first public safety officer to move outside of the second geofence or to avoid entering the second geofence. In some situations, the modification of the first task may instruct the first public safety officer not to perform the first task at all or to wait to perform the first task until the second task of the second public safety officer has been completed. In some embodiments, the electronic computing device controls the screen 205 of the communication device 200 of the first public safety officer to display the adjusted first geofence and/or the second geofence to allow the first officer to view the areas that he or she is allowed to enter and the areas that he or she is not allowed to enter (at block 340). In some embodiments, the electronic computing device additionally or alternatively provides other notifications on the communication device 200 regarding the adjusted first geofence (at block 340). For example, based on the adjusted first geofence, the communication device 200 of the first public safety officer provides visual or audible instructions to direct the first public safety officer outside of a now-restricted area (in other words, the second geofence or a portion of the area covered by the second geofence) and into the adjusted first geofence. As another example, based on the adjusted first geofence, the communication device 200 of the first public safety officer provides audible and/or haptic notifications in response to determining that the communication device 200 is being moved outside of the adjusted first geofence and into the second geofence (for example, as a warning to alert the first public safety officer that he or she is moving into a now-restricted area).

As an example of changing the first task to a third task that does not conflict with the second task, the electronic computing device may change a first task of evidence collection to a different task of securing a perimeter of the incident scene. In some situations, the electronic computing device may reorganize a task list of the first public safety officer based on determining that the first task and the second task conflict. Continuing the above example, when the second task of the second public safety officer is providing aid to an injured victim, the electronic computing device may de-prioritize an evidence collection task of the first public safety officer and replace the evidence collection task with a perimeter security task until the second public safety officer completes the second task. In response to determining that the second task has been completed, the electronic computing device may adjust the task list of the first public safety officer to re-prioritize the evidence collection task.

As an example of determining one or more actions that are to be avoided by the first public safety officer while performing the first task within the second geofence, the electronic computing device may provide instructions that indicate actions that are to be avoided during performance of the first task (at block 340). In other words, the electronic computing device may determine that the first task may be performed without interfering with the second task of the second public safety officer as long as the first public safety officer does not perform certain actions. For example, when the first task is general evidence collection and the second task is forensic evidence collection, the electronic computing device may instruct the first public safety officer that the first task may be completed by visually gathering evidence, taking notes, and taking photographs. However, the electronic computing device may also instruct the first public safety officer that, while performing the first task, the first public safety officer is to avoid touching or moving any objects at the public safety incident scene because such actions may interfere with the second task of forensic evidence collection that has higher priority than the first task.

The above situations are examples of modifying a public safety incident task to attempt to mitigate or avoid a conflict with another public safety task. Other possibilities exist with respect to modifying public safety incident tasks.

At block 340, the electronic computing device provides an instruction to a communication device 200 of the first public safety officer to indicate that the first task has been modified. In some embodiments, the instruction includes at least one of a visual notification provided on a display (for example, a modified geofence provided on the screen 205) of the communication device 200, an audio notification provided with the speaker 222 of the communication device 200, and a haptic notification provided with a motor of the communication device 200. In some embodiments, when the instruction includes a visual notification, the visual notification includes a revised task list including a new task listed ahead of the first task. With reference to the above example of changing the first task to a third task that does not conflict with the second task, the visual notification may include a revised and re-prioritized task list that lists a first task of evidence collection below a new task of securing a perimeter of the incident scene. In this example, the revised and re-prioritized task list indicates that the first task has been modified such that the new task should be performed by the first public safety officer before performing the first task.

In some embodiments where the electronic computing device is implemented in whole or in part by the electronic processor 213 of the communication device 200 of the first public safety officer, the electronic processor 213 may control an output device of the communication device 200 of the first public safety officer to provide the instruction to the first public safety officer (for example, via the screen 205, the speaker 222, a motor configured to provide haptic notifications, and/or the like). In some embodiments where the electronic computing device is implemented in whole or in part by one or more communication devices 200 located separately from the communication device 200 of the first public safety officer (for example, by the infrastructure controller 156, a back-end device in the cloud computing cluster 162, and/or the like), the electronic computing device is configured to provide the instruction to the communication device 200 of the first public safety officer by wirelessly transmitting the instruction to the communication device 200 of the first public safety officer. In response to receiving the instruction, the electronic processor 213 of the communication device 200 of the first public safety officer may provide the instruction to the first public safety officer as described above.

As indicated in FIG. 3, after the electronic computing device completes block 340, the method 300 proceeds back to block 305 to repeat the method 300. Repetition of the method 300 allows the electronic computing device to make updated determinations based on changed situations that occur at the public safety incident and/or new issues that arise at the public safety incident. For example, the electronic computing device may dynamically update one or more geofences where tasks are being performed (in other words, task zones) based on changing situations of the public safety incident. In some embodiments, the electronic computing device may update at least one of the first geofence and the second geofence based on at least one of a status of the first task, a status of the second task, and a determination that a third task is to be performed within one of the first geofence and the second geofence. In some embodiments, the status of a task includes an amount of progress that has been made with respect to completion of the task (for example, whether the task has been completed, abandoned, and the like). In some embodiments, the status of a task changes based on changed conditions at the public safety incident. For example, the status of a task may include a severity level of the task. For example, a small fire may become a larger fire that has spread near explosive chemicals which may cause the electronic computing device to increase the severity level of a fire extinguishing task associated with the fire (in other words, changing the status of the task based on changed conditions of the incident). Continuing this example, in response to the severity level of a task increasing, the electronic computing device may update the geofence associated with the task to increase an area covered by the geofence. In some embodiments, the status of a task changes based on a received command to alter performance of the task or perform a different task. For example, when a public safety officer performing a task is instructed to perform the task differently, the status of the task may change or the electronic computing device may determine that a separate task is to be completed and that the first task that was previously being performed has been abandoned.

In some embodiments, the electronic computing device determines the status of a task in similar ways as were described above regarding monitoring of the public safety incident. For example, upon completion of a task, a public safety officer may indicate that the task has been completed via a user input on the portable radio 104. As another example, upon completion of a task, a public safety officer may use the portable radio 104 to inform a supervisor that the task has been completed, and the electronic computing device may monitor this communication and analyze voice data using the natural language processing engine to determine that the status of the task is complete. As another example, by monitoring one or more cameras of communication devices 200 at the incident scene, the electronic computing device may determine a changed status of a task using image/video analytics techniques (for example, to determine that a fire has spread beyond an initial area in which the fire was located). As another example, the electronic computing device may monitor communication from a supervisor that instructs/commands the public safety officer performing the task to cease performing the task, to perform the task in a different manner, or to perform a different task. The electronic computing device may determine that a status of the task has changed or that a separate task is to be completed based on this monitored communication from the supervisor that provides a direct command to the public safety officer performing the task (for example, by analyzing voice data using the natural language processing engine).

In some embodiments, the electronic computing device determines that the second geofence at least partially overlaps with the first geofence (at block 325 of FIG. 3) in response to updating one of the first geofence and the second geofence based on one or more changed situations at the public safety incident. With reference to the above example regarding a small fire that becomes a larger fire that spreads near explosive chemicals, the electronic computing device determines that a severity level of a task of extinguishing the fire has increased. In response to the changed situation and the increased severity level, the electronic computing device increases a size of the geofence such that the geofence associated with the fire now at least partially overlaps with another geofence that was not at least partially overlapped previously. The electronic computing device may then determine that the geofences at least partially overlap (at block 325 of FIG. 3) and may execute the rest of the method 300 in accordance with the above explanation to prevent and/or mitigate conflict between tasks to be performed in the now-overlapping geofences.

For example, when the fire was a small, contained fire, the geofence associated with a fire extinguishing task may have been established as a fifty meter radius from the location of the fire. This geofence may not have overlapped with another geofence associated with an evidence collection task that was sixty meters away from the fire. However, in response to determining that the fire has spread to be near explosive chemicals, the electronic computing device may increase the radius of the geofence to one hundred meters. In response to determining that the two geofences now overlap (at block 325 of FIG. 3), the electronic computing device may execute blocks 330 through 340 of FIG. 3 to provide an instruction to the communication device 200 of the public safety officer performing the evidence collection task to indicate that the evidence collection task should no longer be performed within one hundred meters of the fire (in other words, within the updated geofence associated with the fire).

In some embodiments, the method 300 is executed by the electronic computing device in response to arrival of new public safety officers on an incident scene. For example, a new officer that arrives at the incident scene may be assigned a new task that may conflict with a task that is currently being performed at the incident scene. Execution of the method 300 of FIG. 3 prevents or mitigates conflict between tasks of different public safety officers by modifying at least one of the tasks and instructing at least one of the officers that their task has been modified. Although the method 300 describes the first task as the task that is modified by the electronic computing device, the term "first task" does not necessarily mean that performance of the first task is started before performance of the second task. In other words, through execution of the method 300, the electronic computing device may (i) modify a first task of an earlier-arriving first officer in response to determining that a later-arriving second officer is assigned a second task with higher priority than the first task; and (ii) modify a first task of a later-arriving first officer in response to determining that an earlier-arriving second officer is performing a second task with higher priority than the first task to be performed by the later-arriving first officer.

In some embodiments, a changed situation at the public safety incident that may cause the electronic computing device to determine conflicts between tasks and provide instructions to public safety officers performing the tasks includes movement of public safety officers at the incident scene. For example, the electronic computing device may establish a center of the first geofence to be a location of the communication device 200 of the first public safety officer, and the first task may be evidence collection. Continuing this example, the electronic computing device may establish the second geofence around a location of an injured victim. In some situations, the first geofence may not initially overlap with the second geofence. However, as the first public safety officer moves while collecting evidence, the electronic computing device may determine that the first geofence at least partially overlaps with the second geofence (at block 325 of FIG. 3). Accordingly, the electronic computing device executes blocks 330 through 340 of FIG. 3 to provide an instruction to the communication device 200 of the first public safety officer performing the evidence collection task to indicate that first public safety officer should move outside of the second geofence and only perform the evidence collection task outside of the second geofence.

As indicated by the immediately above example, in some embodiments, the instruction provided to the communication device 200 of the first public safety officer (at block 340 of FIG. 3) instructs the first public safety officer to move or remain outside of the second geofence. However, in some situations, the first public safety officer may not notice the instruction or may ignore the instruction. Thus, in some embodiments, the electronic computing device may monitor the location of the communication device 200 of the first public safety officer to determine violations of the instruction. As explained below, in some embodiments, the electronic computing device provides escalated notifications to various entities in response to initial violations of the instruction and continued violations of the instruction.

In some embodiments, the electronic computing determines a location of the communication device 200 of the first public safety officer (for example, a third location where the first location corresponds to the first geofence and the second location corresponds to the second geofence as indicated in FIG. 3). The electronic computing device may then determine that the first public safety officer is not acting in accordance with the instruction based on determining the third location of the communication device 200 of the first public safety officer. For example, the electronic computing device may determine that the first public safety officer has entered or has not moved outside of the second geofence in accordance with the instruction.

In response to determining that the first public safety officer is not acting in accordance with the instruction, the electronic computing device may provide a communication link between the communication device 200 of the first public safety officer and an automated calling system. In some embodiments, the automated calling system is configured to provide information regarding at least one of the first task and the second task. In one example, the automated calling system provides an explanation of why the first task conflicts with the second task and/or provides details of the second task that indicate why the priority level of the second task is higher than the first task. As another example, the automated calling system may provide an estimated time of completion of the second task before the first public safety officer may then be authorized to perform the first task. In some embodiments, the electronic computing device determines the information to be provided by the automated calling system by retrieving information associated with the tasks from the database(s) 164. In some embodiments, the automated calling system is configured to receive questions regarding the tasks from the first public safety officer and provide the above-noted example information in response to the questions from the first public safety officer.

After providing the communication link between the communication device 200 of the first public safety officer and the automated calling system, the electronic computing device is configured to wait a predetermined period of time (for example, thirty seconds in order to allow the first public safety officer to act in accordance with the instruction). After the predetermined period of time, the electronic computing device is configured to determine a fourth location of the communication device 200 of the first public safety officer. When the fourth location of the communication device 200 of the first public safety officer is determined to be outside of the second geofence in accordance with the instruction, the electronic computing device does not take further action and may continue to repeat the method 300 of FIG. 3. On the other hand, the electronic computing device may determine that the first public safety officer is still not acting in accordance with the instruction based on determining the fourth location of the communication device 200 of the first public safety officer. For example, the first public safety officer may still be located within the second geofence.

In response to determining that the first public safety officer is still not acting in accordance with the instruction, the electronic computing device may provide a notification to a second communication device 200 of a supervisor of the first public safety officer (for example, a public safety commander, an incident scene commander, a dispatcher, or the like). The notification provides an indication to the supervisor that the first public safety officer is still not acting in accordance with the instruction. Upon receipt of the notification, the supervisor may use the second communication device 200 to communicate with the first public safety officer. Additionally or alternatively, when the supervisor is at the public safety incident (for example, an incident scene commander), the supervisor moves to the fourth location of the first public safety officer to physically speak to the first public safety officer to instruct the first public safety officer to move outside of the second geofence. As yet another alternative, the supervisor provides a manual override of the instruction from the electronic computing device to allow the first public safety officer to remain within the second geofence.

While the above example involved the first public safety officer not moving outside of or not remaining outside of the second geofence, in some situations, the electronic computing device determines that the first public safety officer is not acting in accordance with other instructions. For example, when the instruction indicates that the first public safety officer is to avoid touching or moving objects at a crime scene, the electronic computing device may determine that the first public safety officer is violating the instruction based on analyzing a video stream provided by a camera at the crime scene. In this situation, the electronic computing device may provide escalated notifications including communication with the automated calling system and the notification to a supervisor as described above.

As illustrated by the immediately above examples, the electronic computing device provides escalated notifications regarding violations of instructions to attempt to reduce an amount of communication resources and human resources used to ensure that instructions are being followed. For example, by using an automated calling system to attempt to explain the instruction to the first public safety officer, the violation of the instruction may be corrected without intervention of a dispatcher or supervisor who may use communication resources to communicate with the first public safety officer. In other words, in some embodiments, a violation of the instruction by the first public safety officer is only escalated to a dispatch or supervisor after the violation was attempted to be corrected by allowing the first public safety officer to communicate with the automated calling system. Such an escalation process of violations of instructions may prevent a dispatcher from being overloaded by handling a high amount of violations of instructions at the public safety incident and may accordingly reduce an amount of communication resources used to address violations of instructions.

In some embodiments, the escalation process includes another level in addition to the two levels described in the above examples. For example, the electronic computing device provides a notification of a violation of an instruction to the dispatcher after allowing the first public safety officer to communicate with an automated calling system. After a second predetermined period of time since the dispatcher has communicated with the first public safety officer, the electronic computing device may determine that the violation has still not been corrected and may additionally notify a higher-ranking supervisor and/or an on-scene supervisor that may physically interact with the first public safety officer to correct the violation of the instruction.

Figure 4A:
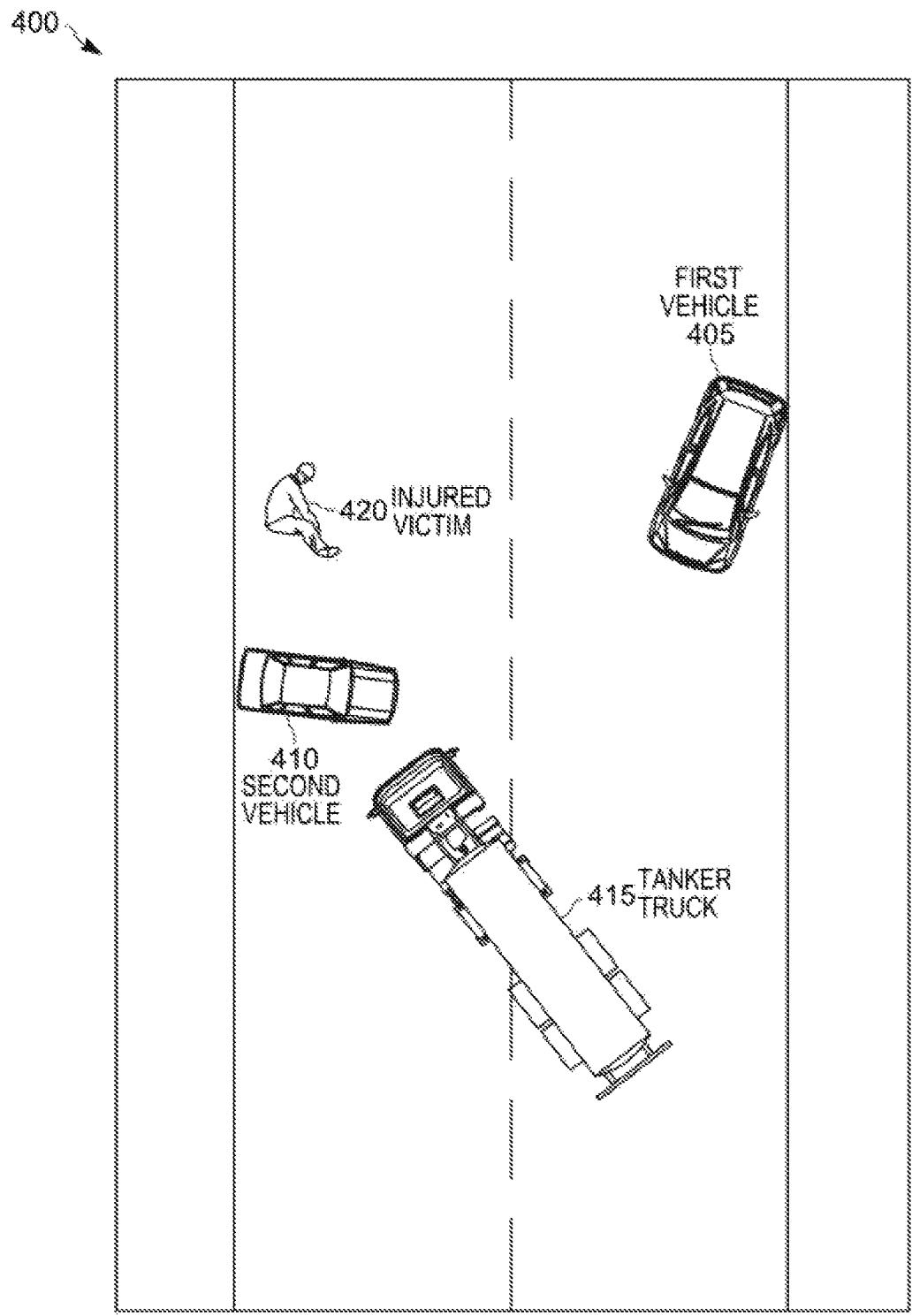
FIGS. 4A through 4D illustrate an example public safety incident at various times while the method of FIG. 3 is being executed by the electronic digital assistant to coordinate task zones at the public safety incident.

As an example implementation of the method 300, FIGS. 4A through 4D illustrate a public safety incident 400 at various times while the method 300 of FIG. 3 is being executed by the electronic computing device implementing an electrical digital assistant to coordinate task zones at the public safety incident 400. As shown in FIG. 4A, the incident 400 is a vehicular accident that involves a first vehicle 405, second vehicle 410, and a tanker truck 415. Also as shown in FIG. 4A, an injured victim 420 has escaped from the second vehicle 410. The vehicular accident may be reported to a public safety dispatcher by a victim and/or a witness calling an emergency number (for example, 9-1-1). For example, a caller may report that two vehicles were involved in an accident with a tanker truck at a location of the incident 400. In response, the dispatcher may dispatch multiple public safety agencies to the incident 400 (for example, police officers, firefighters, paramedics, and the like). In some situations, a public safety officer who first arrives at the incident 400 provides an initial report over the portable radio 104 to the dispatcher and/or other public safety officers. For example, the first-arriving public safety officer may report that the injured victim 420 has escaped from the second vehicle 410 and that a second victim is trapped inside of the first vehicle 405.

Figure 4B:
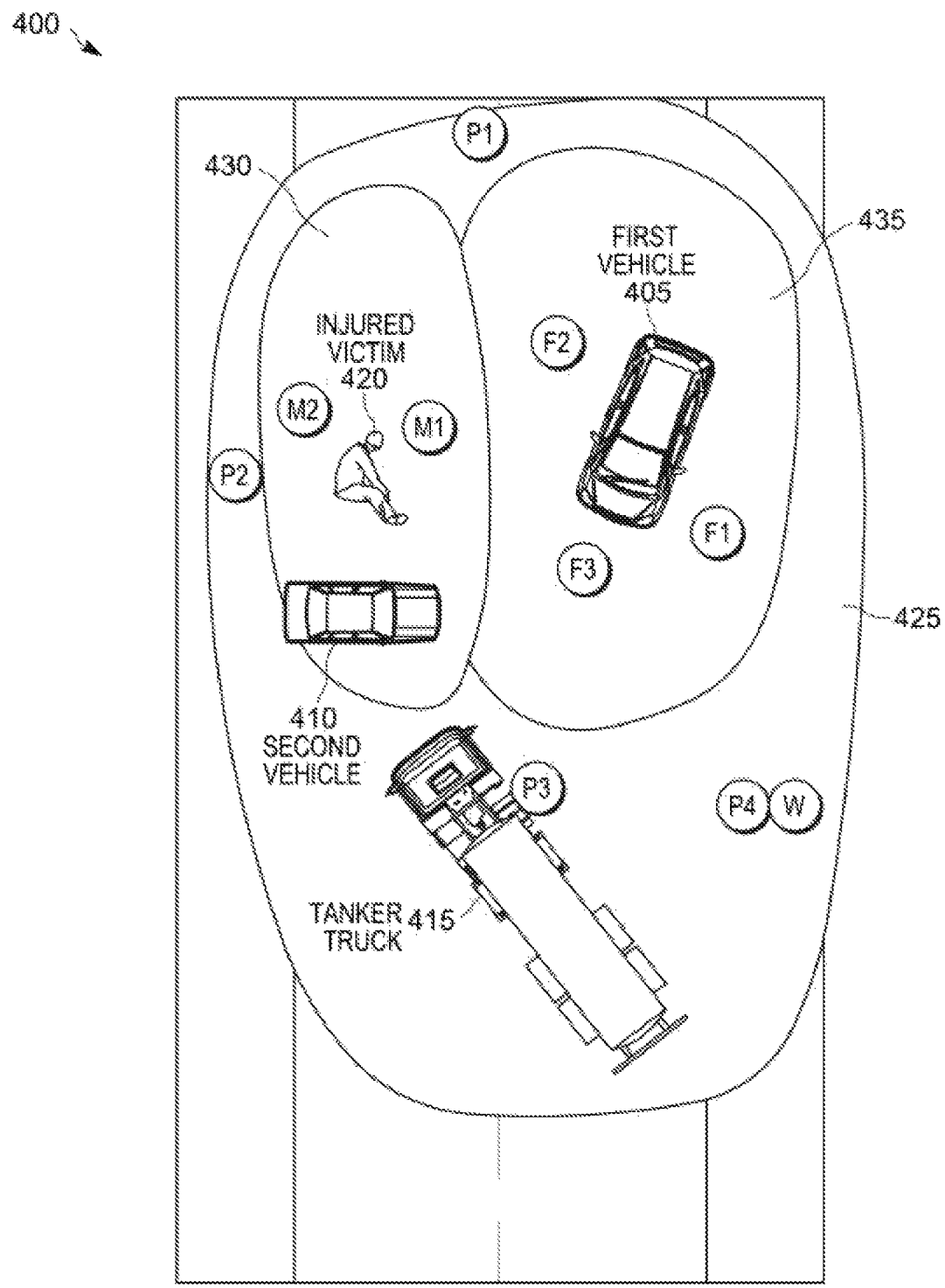

In some situations, the first-arriving public safety officer creates initial task zones based on this information. In other situations, the electronic computing device establishes initial task zones by monitoring communications of the first-arriving officer, a location of the first-arriving officer, and other devices that provide information regarding the incident 400 (for example, security cameras, drone cameras, traffic cameras located nearby, and/or the like). FIG. 4B shows example initial task zones (in other words, geofences) established by the first-arriving officer and/or the electronic computing device. As shown in FIG. 4B, an incident geofence 425 around the entire incident 400 may be established. Additionally, a geofence 430 is established around the injured victim 420 and a geofence 435 is established around the first vehicle 405 in which another victim is trapped. As described previously herein, based on a task type of a task to be performed within the geofences 425, 430, and 435, the electronic computing device may determine the size of the geofences 425, 430, and/or 435. In FIG. 4B, the circles represent people at the incident 400. For example, FIG. 4B shows four police officers P1 through P4, three firefighters F1 through F3, two paramedics M1 and M2, and a witness W.

In some embodiments, different public safety officers are assigned different tasks that may be associated with the geofences 425, 430, and 435. For example, the three firefighters F1 through F3 are assigned a task of rescuing the trapped victim from the first vehicle 405. The two paramedics M1 and M2 are assigned a task of providing medical aid to the injured victim 420. Police officers P1 and P2 are assigned a task of securing a perimeter of the incident 400 to prevent non-public safety personnel from entering the incident scene. Police officer P3 is assigned a task of collecting evidence regarding, for example, a cause of the vehicular accident (for example, inspection of vehicles, skid marks on the road, and the like). Police officer P4 is assigned a task of questioning the witness W to obtain more information about how the vehicular accident occurred.

The electronic computing device determines that the geofences 430 and 435 partially overlap with each other (at block 325 of FIG. 3). However, because each task being performed inside the geofences 430, 435 is a high priority task to help a victim and the centers of the geofences 430, 435 are adequately spaced apart to allow the respective officers to perform their respective tasks, the electronic computing device determines that there is not a conflict between the task being performed in the geofence 430 and the task being performed in the geofence 435.

The electronic computing device may also determine that the geofences 430, 435 overlap with the incident geofence 425. Unlike the overlapping of the geofences 430 and 435, the electronic computing device determines that tasks being performed by, for example, police officer P3 and P4 within the geofence 425 conflict with the tasks being performed in the geofences 430, 435 (at block 330 of FIG. 3). For example, police officers P3 and P4 may accidentally interfere with the firefighters F1 through F3 and/or the paramedics M1 and M2. Additionally, the electronic computing device may determine that the tasks being performed by the police officers P3 and P4 are of lower priority than the tasks being performed by the firefighters F1 through F3 and the paramedics M1 and M2. Accordingly, the electronic computing device modifies the tasks of police officers P3 and P4 by providing an instruction indicating the police officers P3 and P4 should remain outside of the geofences 430, 435 (at block 335 and 340 of FIG. 3). Similarly, the electronic computing device provides an instruction to police officers P1 and P2 indicating that the police officers P1 and P2 should remain outside the geofences 430, 435. This instruction to police officers P1 and P2 allows them to understand how far away to establish a perimeter of the incident scene to ensure that the firefighters F1 through F3 and the paramedics M1 and M2 have adequate space to perform their respective tasks without interference and/or distractions from, for example, non-public safety personnel.

Figure 4C:
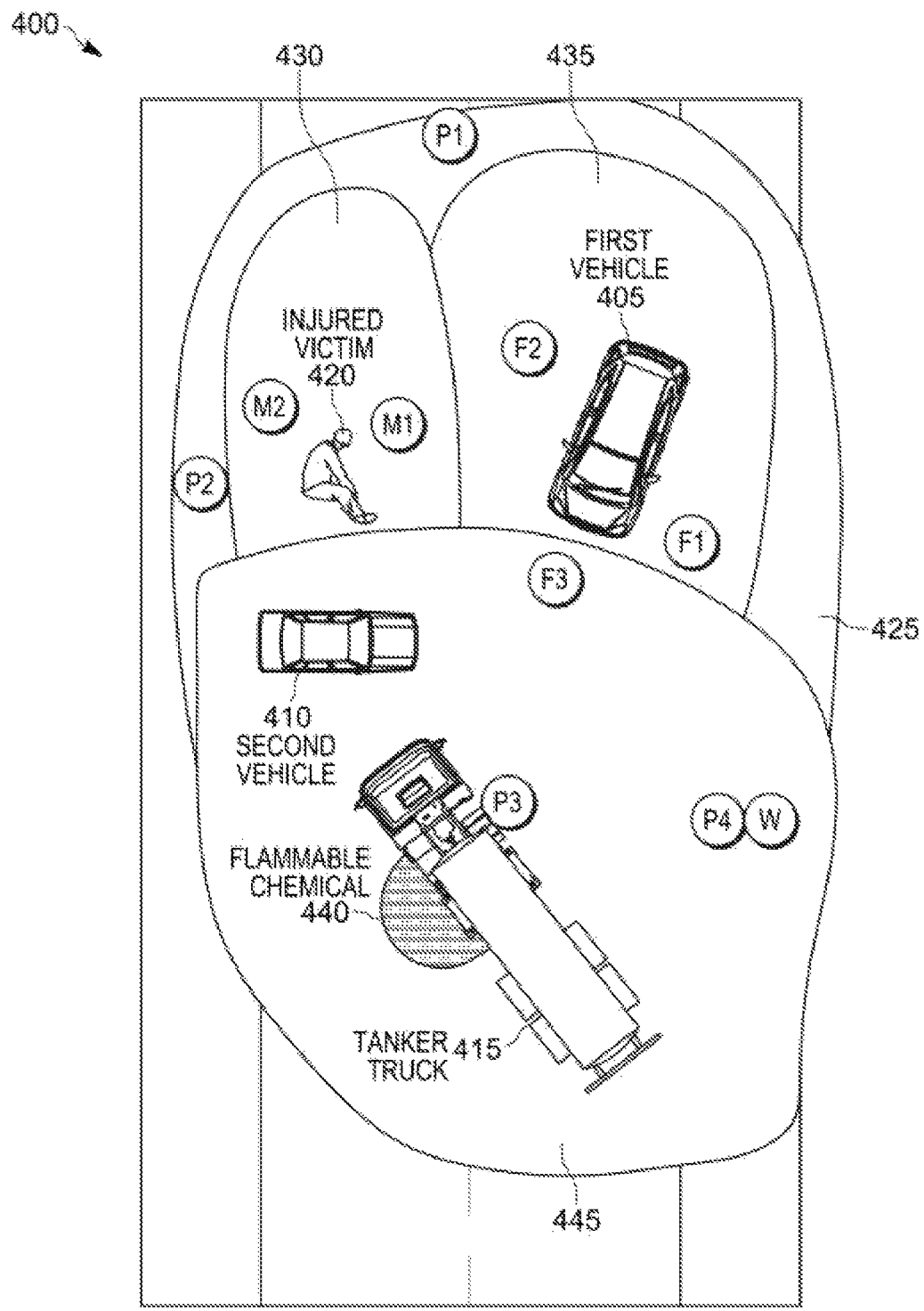

FIG. 4C shows a changed situation at the incident 400 where the tanker truck 415 begins leaking a flammable chemical 440. As an example, the electronic computing device may recognize the flammable chemical leak by performing video/image analysis of a video stream provided by a body-worn camera of an officer at the incident 400 or provided by a traffic camera or drone camera at the incident 400. In response to recognizing the flammable chemical leak, the electronic computing device establishes another geofence 445. The electronic computing device may also determine that the geofence 445 at least partially overlaps with one or more of the geofences 425, 430, and 435 as shown in FIG. 4C (at block 325 of FIG. 3). In response to this determination, the electronic computing device determines whether any of the tasks being performed in the geofences 425, 430, and 435 conflict with the task(s) to be performed in the geofence 445. The task(s) to be performed in the geofence 445 may include preventing the flammable chemical 440 from further leaking and preventing/extinguishing a fire caused by the flammable chemical 440. The electronic computing device may determine that these tasks to be performed within the geofence 445 are of high priority and that the tasks of the police officers P3 and P4 conflict with these high priority tasks and are of lower priority than the high priority tasks (at block 330 of FIG. 3). Accordingly, the electronic computing device modifies the tasks of police officers P3 and P4 by providing an instruction indicating the police officers P3 and P4 should move outside of the geofence 445 (at block 335 and 340 of FIG. 3). In some situations, the electronic computing device may modify the task of the police officer P3 by instructing police officer P3 to perform a different task (for example, securing a perimeter of the incident scene as shown in FIG. 4D).

Similarly, the electronic computing device may determine that the task of firefighter F3 conflicts with the high priority tasks to be performed within the geofence 445 because the firefighter F3 may not be wearing fire-protective gear. Accordingly, the electronic computing device may provide an instruction to the communication device 200 of firefighter F3 indicating that firefighter F3 should move outside the geofence 445 or put on fire protective gear.

Figure 4D:
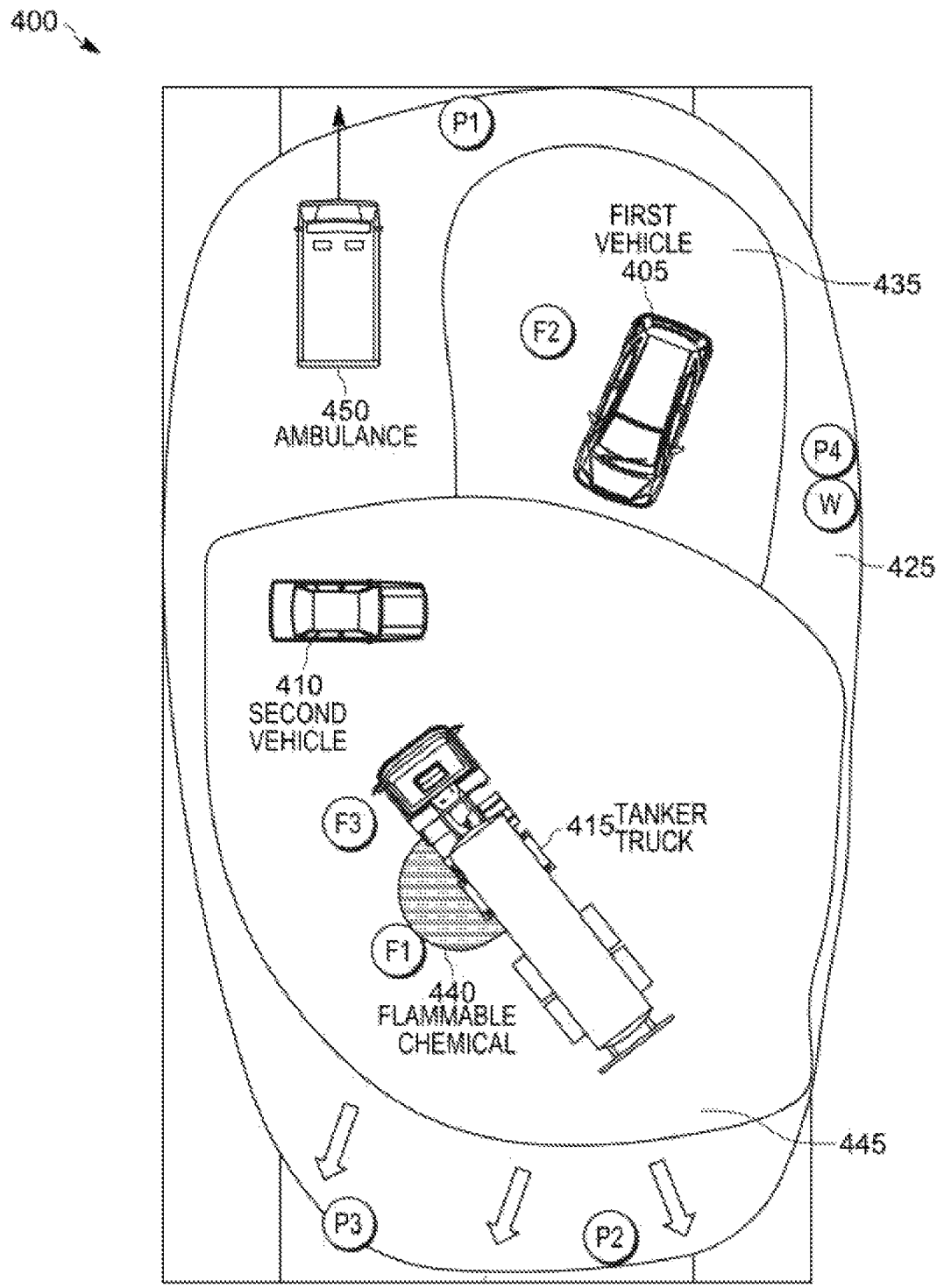

As shown in FIG. 4D, police officer P4 and witness W have moved outside of the geofence 445 in accordance with the instruction from the electronic computing device. Additionally, police officer P3 has also moved outside of the geofence 445 and is performing a new/re-prioritized task of extending and securing a perimeter of the incident scene in accordance with the instruction from the electronic computing device. Furthermore, police officer P2 may have been reassigned the same task as P3 to extend and secure the perimeter of the incident scene. Firefighter F3 may have put on fire-protective gear as instructed and, thus, the presence of firefighter F3 within the geofence 445 no longer conflicts with the task to be performed within the geofence 445. Additionally, firefighters F1 and F3 may have been reassigned a task to clean up the flammable chemical 440 and prevent/extinguish any fires that may result from the flammable chemical leak. Also as shown in FIG. 4D, ambulance 450 is leaving the incident scene to take the injured victim 420 to a hospital. The electronic computing device may recognize that the task of providing medical care to the injured victim 420 has been completed (for example, by monitoring communications of the paramedics M1 and M2, by monitoring one or more cameras providing video of the incident 400, and/or the like). In response to this determination, the electronic computing device removes the geofence 430. Accordingly, when police officer P3 completes the task of extending and securing the perimeter of the incident scene, police officer P3 may engage in the previously-assigned task of evidence collection in the area where the geofence 430 was previously located and where the police officer P3 was previously instructed not to enter due to the conflict with the task of the paramedics M1 and M2.

The incident 400 of FIGS. 4A through 4D and corresponding description is an example. The electronic computing device may perform the method 300 with respect to many different types of incidents and in different ways than are explained with respect to the example incident 400.

Figure 5:
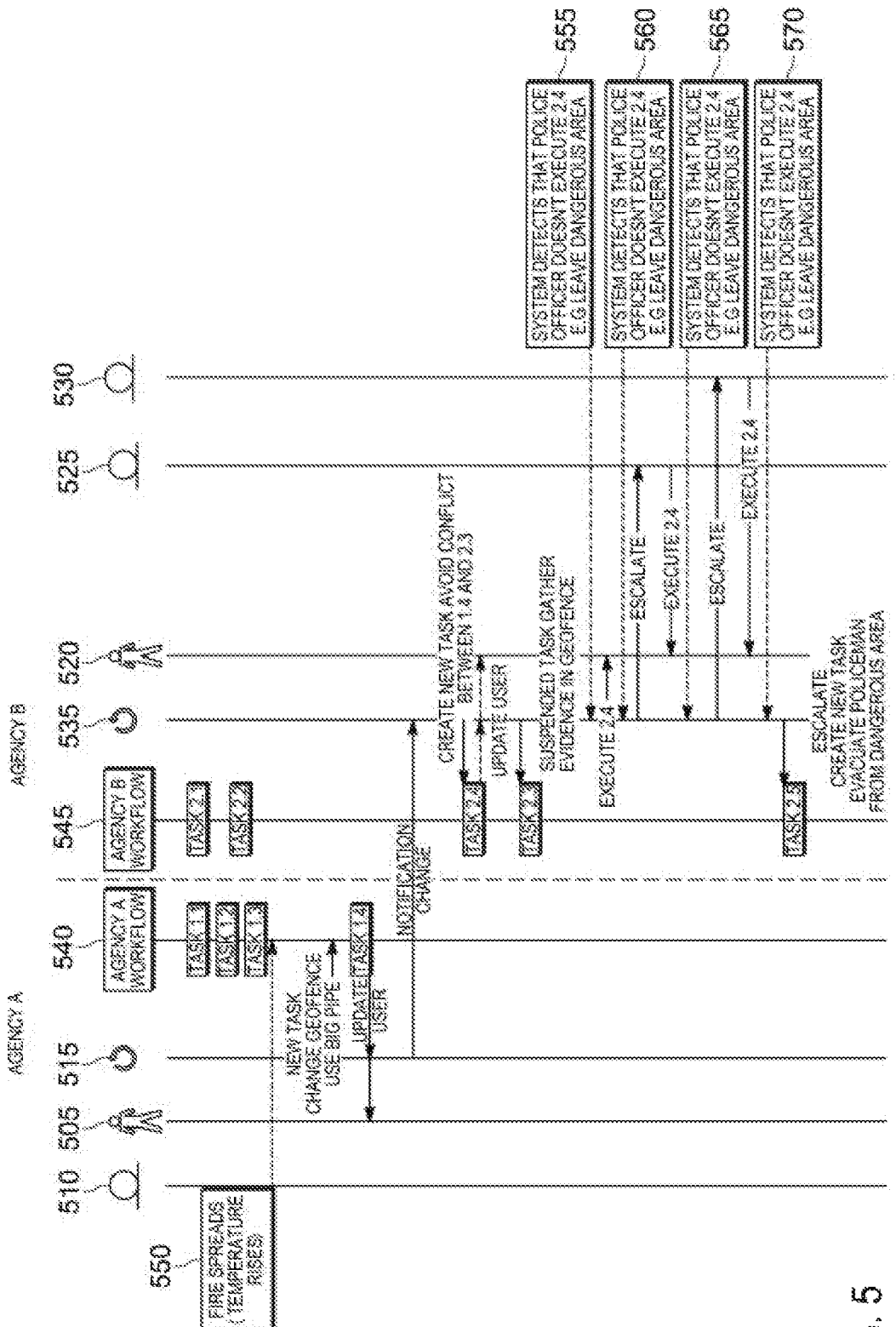
FIG. 5 is a sequence diagram of an example public safety incident involving two different public safety agencies.

As another example use case of the method 300, FIG. 5 is a sequence diagram of an example public safety incident involving two different public safety agencies. As shown in FIG. 5, Agency A is a firefighting public safety agency including a firefighter 505, a firefighter commander 510, and an electronic digital assistant 515 (in other words, a virtual partner) implemented by the electronic computing device. In some embodiments, Agency B is a police public safety agency including a police officer 520, a dispatcher 525, a police commander 530, and an electronic digital assistant 535. Although the electronic digital assistants 515 and 535 are separately labeled in FIG. 5, in some embodiments, the electronic digital assistant 515 and 535 may communicate with each other and may be considered a single electronic digital assistant implemented by the electronic computing device described previously herein. As indicated by FIG. 5, different entities may communicate with each other. For example, the dispatcher 525 and the police officer 520 may communicate with each other and/or with the electronic digital assistant 535. It should be understood that while such communication is explained as occurring between these entities, such communication may be occurring between the communication devices 200 of these entities.

As shown in FIG. 5, each agency may have a different workflow that includes different tasks to be performed by the public safety officers at the public safety incident (for example, Agency A workflow 540 and Agency B workflow 545). In some embodiments, the Agency A workflow 540 initially includes tasks 1.1, 1.2, and 1.3 and the Agency B workflow 545 initially includes tasks 2.1, 2.2, and 2.3 when officers from the Agencies A and B arrive at the public safety incident. Even though only one officer is shown for each agency in FIG. 5, in some embodiments, the tasks in each workflow 540, 545 are to be performed by multiple officers or different officers. For example, task 1.1 may be connecting a fire hose to a fire hydrant that is to be performed by a first public safety officer, and task 1.2 may be entering a burning building to save a trapped victim that is to be performed by a second public safety officer. The tasks for each agency are shown spaced apart from each other in FIG. 5 to indicate an estimated amount of time to perform each task with the passage of time indicated from top to bottom. For example, task 2.1 may be estimated to take less time than task 2.3.

As time passes at the public safety incident, one or more conditions at the public safety incident may change such that new tasks are generated and/or existing tasks are changed or re-prioritized as described previously herein. For example, during a public safety incident involving a fire, the fire may spread and the temperature of the fire may rise as indicated by block 550 of FIG. 5. In some embodiments, the electronic digital assistant 515 recognizes the spreading of the fire as described previously herein (for example, by monitoring communications between firefighters, by performing video analytics of a video feed from a body-worn camera, a traffic camera, or a security camera, and/or the like). In response to determining a changed situation at the public safety incident (in other words, the spreading of the fire), the electronic digital assistant 515 generates a new task 1.4. For example, the new task 1.4 may instruct a firefighter to use a larger pipe to connect a fire hose to a water source. The electronic digital assistant 515 may also modify a geofence associated with one or more tasks relating to the fire in response to determining that the fire has spread. For example, the electronic digital assistant 515 expands the geofence associated with the fire. As indicated in FIG. 5, the electronic digital assistant 515 also provides an updated instruction and/or task list to the firefighter 505 to inform the firefighter 505 of the new task 1.4 to be performed. As also indicated in FIG. 5, the electronic digital assistant 515 may also provide a notification of the new task 1.4 to the electronic digital assistant 535 of Agency B.

In response to receiving the notification of the new task 1.4 from the electronic digital assistant 515, the electronic digital assistant 535 creates a new task 2.4 to attempt to prevent or mitigate a conflict between an ongoing task or a future task to be performed by an officer of Agency B. For example, when the electronic digital assistant 535 determines that task 2.3 includes gathering of evidence in an area that is now included in the increased geofence of task 1.4 associated with the fire, the electronic digital assistant 535 suspends task 2.3 to prevent or mitigate a conflict between task 2.3 and task 1.4. For example, the new task 2.4 may instruct the police officer 520 to relocate to an area outside of the increased geofence associated with the fire. In some embodiments, the electronic digital assistant 535 provides an updated instruction and/or task list to the police officer 520 based on the new task 2.4 to inform the police officer 520 that task 2.3 has been suspended and should not be performed. The electronic digital assistant 535 may also update the workflow 545 of Agency B to remove task 2.3 or move task 2.3 to a future time to re-evaluate whether the conflict still exists.

After a predetermined period of time has passed since the electronic digital assistant 535 provided the updated instruction to the police officer 520, the electronic digital assistant 535 may determine that the police officer 520 is not acting in accordance with the new task 2.4 at block 555 of FIG. 5. In other words, the electronic digital assistant 535 may determine that the police officer has not relocated to an area outside of the geofence associated with the fire by, for example, determining a location of a communication device 200 being carried by the police officer 520 as described above. In response to determining that the police officer 520 is not acting in accordance with the new task 2.4, the electronic digital assistant 535 may provide another instruction to the police officer 520 to execute the new task 2.4 (in other words, relocate outside of the geofence associated with the fire).

After a predetermined period of time has passed since the electronic digital assistant 535 provided the second instruction to the police officer 520, the electronic digital assistant 535 determines that the police officer 520 is still not acting in accordance with the new task 2.4 at block 560 of FIG. 5. In response to determining that the police officer 520 is still not acting in accordance with the new task 2.4, the electronic digital assistant 535 escalates a notification of disobedience to the dispatcher 525 who then communicates the instruction of task 2.4 to the police officer 520 (for example, by communicating with the police officer 520 using a communication device 200).

After a predetermined period of time has passed since the electronic digital assistant 535 escalated the notification of disobedience to the dispatcher 525, the electronic digital assistant 535 may determine that the police officer 520 is still not acting in accordance with the new task 2.4 at block 565 of FIG. 5. In response to determining that the police officer 520 is still not acting in accordance with the new task 2.4, the electronic digital assistant 535 escalates a notification of disobedience to the police commander 530 who then communicates the instruction of task 2.4 to the police officer 520 (for example, by communicating with the police officer 520 using a communication device 200 or by communicating in-person with the police officer 520 when the police commander 530 is located at the public safety incident).

After a predetermined period of time has passed since the electronic digital assistant 535 escalated the notification of disobedience to the police commander 530, the electronic digital assistant 535 may determine that the police officer 520 is still not acting in accordance with the new task 2.4 at block 570 of FIG. 5. In response to determining that the police officer 520 is still not acting in accordance with the new task 2.4, the electronic digital assistant 535 may create a new task 2.5 to have the police officer 520 evacuated from the geofence associated with the fire. For example, the electronic digital assistant 535 assigns the new task 2.5 to two other police officers to physically remove the police officer 520 from the geofence associated with the fire. As indicated by the above explanation of blocks 555 through 570 of FIG. 5, the electronic digital assistant may gradually escalate notifications of violations of instructions associated with tasks.

The actions performed by the electronic digital assistants 515 and 535 of FIG. 5 are merely examples. The electronic computing device implementing one or both of the electronic digital assistant 515 and 535 may perform the method 300 with respect to many different types of incidents and in different ways than are explained with respect to the sequence diagram of FIG. 5.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms for example first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. An electronic computing device comprising:
an electronic processor configured to
determine a first task to be performed at a public safety incident scene by a first public safety officer of a first public safety agency;
establish a first geofence around a first location at which the first task is to be performed based on a task type of the first task;
determine a second task to be performed at the public safety incident scene by a second public safety officer of a second public safety agency;
establish a second geofence around a second location at which the second task is to be performed based on a task type of the second task;
determine that the second geofence at least partially overlaps with the first geofence;
in response to determining that the second geofence at least partially overlaps with the first geofence, determine whether the first task conflicts with the second task based on the task type of the first task and the task type of the second task;
in response to determining that the first task conflicts with the second task, modify the first task based on a priority level of the first task relative to a priority level of the second task; and
provide an instruction to a communication device of the first public safety officer to indicate that the first task has been modified.

2. The electronic computing device of claim 1, wherein the electronic processor is further configured to update at least one of the group consisting of the first geofence and the second geofence based on at least one of the group consisting of a status of the first task, a status of the second task, and a determination that a third task is to be performed within one of the first geofence and the second geofence; and
wherein the electronic processor is configured to determine that the second geofence at least partially overlaps with the first geofence in response to updating the at least one of the group consisting of the first geofence and the second geofence.

3. The electronic computing device of claim 1, wherein the instruction instructs the first public safety officer to move or remain outside of the second geofence, and the electronic processor is further configured to:
determine a third location of the communication device of the first public safety officer;
determine that the first public safety officer is not acting in accordance with the instruction based on determining the third location of the communication device of the first public safety officer;
in response to determining that the first public safety officer is not acting in accordance with the instruction, provide a communication link between the communication device and an automated calling system, wherein the automated calling system is configured to provide information regarding at least one of the group consisting of the first task and the second task;
wait a predetermined period of time after providing the communication link between the communication device and the automated calling system;
after the predetermined period of time, determine a fourth location of the communication device of the first public safety officer;
determine that the first public safety officer is still not acting in accordance with the instruction based on determining the fourth location of the communication device of the first public safety officer; and
in response to determining that the first public safety officer is still not acting in accordance with the instruction, provide a notification to a second communication device of a supervisor of the first public safety officer, the notification indicating that the first public safety officer is still not acting in accordance with the instruction.

4. The electronic computing device of claim 1, wherein the electronic processor is configured to modify the first task by at least one of the group consisting of (i) adjusting the first geofence to avoid overlap with the second geofence, (ii) changing the first task to a third task that does not conflict with the second task, and (iii) determining one or more actions that are to be avoided by the first public safety officer while performing the first task within the second geofence.

5. The electronic computing device of claim 1, wherein the instruction includes at least one of the group consisting of a visual notification provided on a display of the communication device, an audio notification provided with a speaker of the communication device, and a haptic notification provided with a motor of the communication device.

6. The electronic computing device of claim 5, wherein the visual notification includes a revised task list including a new task listed ahead of the first task.

7. The electronic computing device of claim 1, wherein the electronic computing device includes a second communication device located separately from the communication device of the first public safety officer; and
wherein the electronic processor is configured to provide the instruction to the communication device by wirelessly transmitting, with a network interface of the electronic computing device, the instruction to the communication device.

8. The electronic computing device of claim 1, wherein the electronic processor is configured to determine the first task and the second task and to establish the first geofence and the second geofence by at least one of the group consisting of (i) accessing a database of each of the first public safety agency and the second public safety agency, (ii) monitoring communications of the communication device of the first public safety officer and communications of a second communication device of the second public safety officer, and (iii) receiving information from a third communication device of a supervisor of the public safety incident scene, the information being received via user input on the third communication device and being transmitted by the third communication device to the electronic computing device.

9. The electronic computing device of claim 1, wherein the electronic processor is configured to determine whether the first task conflicts with the second task by accessing one or more databases including information regarding performance of at least one of the group consisting of the first task and the second task; and
wherein the information includes at least one of the group consisting of actions to be taken by a person when performing at least one of the group consisting of the first task and the second task, actions to be avoided by the person when performing at least one of the group consisting of the first task and the second task, and an estimated amount of space for performance of at least one of the group consisting of the first task and the second task.

10. The electronic computing device of claim 1, wherein the electronic processor is configured to determine the priority level of the first task relative to the priority level of the second task by accessing a database that includes a plurality of public safety tasks and a priority level associated with each public safety task.

11. A method of coordinating task zones at a public safety incident scene, the method comprising:
determining, with an electronic processor of an electronic computing device, a first task to be performed by a first public safety officer of a first public safety agency;
establishing, with the electronic processor, a first geofence around a first location at which the first task is to be performed based on a task type of the first task;
determining, with the electronic processor, a second task to be performed by a second public safety officer of a second public safety agency;
establishing, with the electronic processor, a second geofence around a second location at which the second task is to be performed based on a task type of the second task;
determining, with the electronic processor, that the second geofence at least partially overlaps with the first geofence;
in response to determining that the second geofence at least partially overlaps with the first geofence, determining, with the electronic processor, that the first task conflicts with the second task based on the task type of the first task and the task type of the second task;
in response to determining that the first task conflicts with the second task, modifying, with the electronic processor, the first task based on a priority level of the first task relative to a priority level of the second task; and
providing, with the electronic processor, an instruction to a communication device of the first public safety officer to indicate that the first task has been modified.

12. The method of claim 11, further comprising updating, with the electronic processor, at least one of the group consisting of the first geofence and the second geofence based on at least one of the group consisting of a status of the first task, a status of the second task, and a determination that a third task is to be performed within one of the first geofence and the second geofence;
wherein determining that the second geofence at least partially overlaps with the first geofence includes determining that the second geofence at least partially overlaps with the first geofence in response to updating the at least one of the group consisting of the first geofence and the second geofence.

13. The method of claim 11, wherein the instruction instructs the first public safety officer to move or remain outside of the second geofence, and further comprising:
determining, with the electronic processor, a third location of the communication device of the first public safety officer;
determining, with the electronic processor, that the first public safety officer is not acting in accordance with the instruction based on determining the third location of the communication device of the first public safety officer;
in response to determining that the first public safety officer is not acting in accordance with the instruction, providing a communication link between the communication device and an automated calling system, wherein the automated calling system is configured to provide information regarding at least one of the group consisting of the first task and the second task;
waiting, with the electronic processor, a predetermined period of time after providing the communication link between the communication device and the automated calling system;

after the predetermined period of time, determining, with the electronic processor, a fourth location of the communication device of the first public safety officer;

determining, with the electronic processor, that the first public safety officer is still not acting in accordance with the instruction based on determining the fourth location of the communication device of the first public safety officer; and in response to determining that the first public safety officer is still not acting in accordance with the instruction, providing, with the electronic processor, a notification to a second communication device of a supervisor of the first public safety officer, the notification indicating that the first public safety officer is still not acting in accordance with the instruction.

14. The method of claim 11, wherein modifying the first task includes at least one of the group consisting of (i) adjusting the first geofence to avoid overlap with the second geofence, (ii) changing the first task to a third task that does not conflict with the second task, and (iii) determining one or more actions that are to be avoided by the first public safety officer while performing the first task within the second geofence.

15. The method of claim 11, wherein providing the instruction includes at least one of the group consisting of providing a visual notification on a display of the communication device, providing an audio notification with a speaker of the communication device, and providing a haptic notification with a motor of the communication device.

16. The method of claim 15, wherein the visual notification includes a revised task list including a new task listed ahead of the first task.

17. The method of claim 11, wherein the electronic computing device includes a second communication device located separately from the communication device of the first public safety officer, and further comprising:

providing, with the electronic processor, the instruction to the communication device by wirelessly transmitting, with a network interface of the electronic computing device, the instruction to the communication device.

18. The method of claim 11, wherein determining the first task and the second task and establishing the first geofence and the second geofence include at least one of the group consisting of (i) accessing a database of each of the first public safety agency and the second public safety agency, (ii) monitoring communications of the communication device of the first public safety officer and communications of a second communication device of the second public safety officer, and (iii) receiving information from a third communication device of a supervisor of the public safety incident scene, the information being received via user input on the third communication device and being transmitted by the third communication device to the electronic computing device.

19. The method of claim 11, wherein determining that the first task conflicts with the second task includes accessing one or more databases including information regarding performance of at least one of the group consisting of the first task and the second task; and wherein the information includes at least one of the group consisting of actions to be taken by a person when performing at least one of the group consisting of the first task and the second task, actions to be avoided by the person when performing at least one of the group consisting of the first task and the second task, and an estimated amount of space for performance of at least one of the group consisting of the first task and the second task.

20. The method of claim 11, further comprising determining, by the electronic processor, the priority level of the first task relative to the priority level of the second task by accessing a database that includes a plurality of public safety tasks and a priority level associated with each public safety task.

* * * * *